US012701315B2

(12) United States Patent
Park et al.

(10) Patent No.: US 12,701,315 B2
(45) Date of Patent: Aug. 4, 2026

(54) VEHICLE COMPONENT VOICE CONTROL BASED ON IMAGE CAPTURES

(71) Applicants: Hyundai Motor Company, Seoul (KR); Kia Corporation, Seoul (KR)

(72) Inventors: Minjae Park, Seongnam-Si (KR); Jaemin Moon, Yongin-Si (KR); Sungwang Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 497 days.

(21) Appl. No.: 18/082,784

(22) Filed: Dec. 16, 2022

(65) Prior Publication Data

US 2023/0206918 A1 Jun. 29, 2023

(30) Foreign Application Priority Data

Dec. 29, 2021 (KR) ........................ 10-2021-0191571

(51) Int. Cl.
| | |
|---|---|
| *G10L 15/22* | (2006.01) |
| *B60K 35/10* | (2024.01) |
| *B60K 35/23* | (2024.01) |
| *B60K 35/26* | (2024.01) |
| *B60K 35/28* | (2024.01) |
| *B60K 35/60* | (2024.01) |
| *B60K 35/65* | (2024.01) |

(Continued)

(52) U.S. Cl.
CPC .............. *G10L 15/22* (2013.01); *B60K 35/10* (2024.01); *B60K 35/23* (2024.01); *B60K 35/265* (2024.01); *B60K 35/28* (2024.01); *B60K 35/60* (2024.01); *B60K 35/658* (2024.01); *B60K 35/81* (2024.01); *B60R 1/29* (2022.01); *G06F 3/165* (2013.01); *G06F*

*3/167* (2013.01); *G06T 11/23* (2026.01); *G10L 15/1815* (2013.01); *H04N 23/695* (2023.01); *H04N 23/90* (2023.01); *B60K 35/22* (2024.01); *B60K 35/26* (2024.01); *B60K 35/90* (2024.01); *B60K 2360/143* (2024.01); *B60K 2360/148* (2024.01); *B60R 1/22* (2022.01);

(Continued)

(58) Field of Classification Search
None
See application file for complete search history.

(56) References Cited

U.S. PATENT DOCUMENTS

| | | | |
|---|---|---|---|
| 10,937,419 B2 | 3/2021 | Fleurence et al. | |
| 2007/0208248 A1* | 9/2007 | Harvey .................. | G01R 33/54 |
| | | | 600/410 |

(Continued)

FOREIGN PATENT DOCUMENTS

| | | |
|---|---|---|
| JP | 2017090614 A | 5/2017 |
| JP | 201797206 A | 6/2017 |

(Continued)

*Primary Examiner* — Paras D Shah
*Assistant Examiner* — Ali M Hassan
(74) *Attorney, Agent, or Firm* — Banner & Witcoff, Ltd.

(57) ABSTRACT

A vehicle may include: a display provided inside the vehicle; and a controller configured to control the display, based on a condition being satisfied, to display a vehicle image comprising a graphic object and a plurality of indicators, wherein the graphic object indicates a plurality of portions of the vehicle image, and wherein each of the plurality of indicators is respectively associated with one of the plurality of portions. Based on a user utterance associated with at least one indicator of the plurality of indicators, the controller may be configured to control a control target corresponding to the at least one indicator.

17 Claims, 17 Drawing Sheets

(51) Int. Cl.

| | |
|---|---|
| *B60K 35/81* | (2024.01) |
| *B60R 1/29* | (2022.01) |
| *G06F 3/16* | (2006.01) |
| *G06T 11/23* | (2026.01) |
| *G10L 15/18* | (2013.01) |
| *H04N 23/695* | (2023.01) |
| *H04N 23/90* | (2023.01) |
| *B60K 35/22* | (2024.01) |
| *B60K 35/90* | (2024.01) |
| *B60R 1/22* | (2022.01) |

(52) U.S. Cl.
CPC ..... *B60R 2300/105* (2013.01); *B60R 2300/20* (2013.01); *B60R 2300/304* (2013.01); *B60R 2300/8006* (2013.01); *G10L 2015/223* (2013.01)

(56) References Cited

U.S. PATENT DOCUMENTS

| | | | | |
|---|---|---|---|---|
| 2019/0001987 A1* | 1/2019 | Kim | ...................... | B60W 40/02 |
| 2019/0391716 A1* | 12/2019 | Badr | ...................... | G08C 17/02 |
| 2020/0312063 A1* | 10/2020 | Balakrishnan | ........... | B60Q 9/00 |
| 2021/0276575 A1* | 9/2021 | Salter | .................. | G06V 40/113 |
| 2021/0333869 A1* | 10/2021 | Cho | ...................... | B60K 35/28 |
| 2021/0347328 A1* | 11/2021 | Bhattacharya | ....... | G05B 13/027 |

FOREIGN PATENT DOCUMENTS

| | | | | | |
|---|---|---|---|---|---|
| JP | 2019197317 | A | 11/2019 | | |
| KR | 102132058 | B1 | 7/2020 | | |
| KR | 10-2021-0070645 | A | 6/2021 | | |
| WO | WO-2018212801 | A1 * | 11/2018 | ........... | G06F 1/1686 |

* cited by examiner

100

VEHICLE COMPONENT VOICE CONTROL BASED ON IMAGE CAPTURES

CROSS-REFERENCE TO RELATED APPLICATION

This application claims under 35 U.S.C. § 119 the benefit of Korean Patent Application No. 10-2021-0191571, filed on Dec. 29, 2021 in the Korean Intellectual Property Office, the entire contents of which are incorporated herein by reference.

BACKGROUND

1. Field

The disclosure relates to a vehicle, a speech recognition system, and a method for providing a speech recognition service that may provide a service corresponding to a user's utterance and/or speech.

2. Discussion of the Background

A speech recognition system may be capable of identifying what is intended by a user from a user's utterance and/or speech and providing a service corresponding to the identified user intention.

A speech recognition system may be linked to a computer or a specific device (e.g., a vehicle) to control the device and provide specific information according to a user's intention.

If a speech recognition system is provided in a vehicle, a user may control the vehicle, obtain information and/or be provided with services by providing a user's utterance as an input.

In order to accurately control a vehicle using a speech recognition system, the name of a control object may be required to be accurately uttered by a user. However, users may not be familiar with the names of vehicle components or may want to utter a shorter name (e.g., an acronym, a name abbreviation, etc.) of vehicle components for convenience, and the users may often not utter a vehicle component's full name.

SUMMARY

The following summary presents a simplified summary of certain features. The summary is not an extensive overview and is not intended to identify key or critical elements.

An aspect of the disclosure provides a vehicle, a speech recognition system, and a method for providing a speech recognition service that may guide a user's speech to specify a control target by displaying a vehicle image where constituent components which are control targets are captured.

Additional aspects of the disclosure will be set forth in part in the description which follows and, in part, will be obvious from the description, or may be learned by practice of the disclosure.

A vehicle may comprise: a display provided inside the vehicle; and a controller configured to control the display, based on a condition being satisfied, to display a vehicle image comprising a graphic object and a plurality of indicators, wherein the graphic object indicates a plurality of portions of the vehicle image, wherein each of the plurality of indicators is respectively associated with one of the plurality of portions, and wherein the controller is configured to control, based on a user utterance associated with at least one indicator of the plurality of indicators, a control target corresponding to the at least one indicator.

The graphic object may comprise a two-dimensional (2D) grid superimposed on the vehicle image, wherein each of the plurality of indicators is respectively superimposed on one of the plurality of portions, and wherein the plurality of portions are defined by the 2D grid.

The graphic object may comprise a contour indicating a boundary of each of a plurality of objects comprised in the vehicle image, wherein each of the plurality of indicators is respectively superimposed on one of the plurality of portions, and wherein the plurality of portions are defined by the contour.

The condition may comprise at least one of: a first condition that requires a subsequent user utterance to specify the control target; or a second condition in which a context that requires a control for a specific control target occurs.

The vehicle may comprise a first camera configured to capture a rear interior of the vehicle and a second camera configured to capture a front interior of the vehicle.

The controller may be configured to control at least one of: based on a control target candidate being located in the rear interior of the vehicle, the first camera to capture the vehicle image, or based on a control target candidate being located in the front interior of the vehicle, the second camera to capture the vehicle image.

The vehicle may comprise a rotatable camera configured to capture a rear interior of the vehicle at a first rotation angle and capture a front interior of the vehicle at a second rotation angle.

The controller may be configured to control at least one of: based on a control target candidate being located in the rear interior of the vehicle, a rotation of the rotatable camera at the first rotation angle to capture the vehicle image, or based on a control target candidate being located in the front interior of the vehicle, a rotation of the rotatable camera at the second rotation angle to capture the vehicle image.

The vehicle may comprise a communication device configured to receive a result processing signal for controlling the vehicle, wherein the result processing signal indicates a user intention associated with the user utterance, wherein the controller is configured to control the control target based on the result processing signal.

The vehicle may comprise a speaker, wherein the controller is configured to: determine, based on a plurality of control targets corresponding to the at least one indicator being identified, that the condition is satisfied; and control the speaker to output a guide signal for specifying the control target as a control target intended by a user among the plurality of control targets.

The controller may be configured to control the display to display an enlarged portion, of the plurality of portions, on which the at least one indicator is displayed, and adjust the 2D grid and the plurality of indicators to correspond to the enlarged portion on which the at least one indicator is displayed.

A speech recognition system may comprise: a communication device configured to receive data indicating an utterance of a user in a vehicle; at least one processor; and memory storing instructions that, when executed by the at least one processor, cause the speech recognition system to: determine, based on the data indicating the utterance of the user, an action and a control target intended by the user; and generate, based on a determination of the action and the control target, a result processing signal for displaying a vehicle image on a display of the vehicle, wherein the vehicle image comprises a graphic object and a plurality of indicators, wherein the graphic object indicates a plurality of portions of the vehicle image, and wherein each of the plurality of indicators is respectively associated with one of the plurality of portions.

The communication device may be configured to receive data comprising at least one indicator of the plurality of indicators, and wherein the instructions, when executed by the at least one processor, cause the speech recognition system to determine the control target, wherein the control target corresponds to the at least one indicator.

The graphic object may comprise a two-dimensional (2D) grid superimposed on the vehicle image, wherein each of the plurality of indicators is respectively superimposed on one of the plurality of portions, and wherein the plurality of portions are defined by the 2D grid.

The instructions, when executed by the at least one processor, may cause the speech recognition system to map a component of the vehicle to: at least one indicator superimposed on at least one portion of the plurality of portions; or the at least one portion of the plurality of portions.

The instructions, when executed by the at least one processor, may cause the speech recognition system to determine, as the control target, a component of the vehicle mapped to: the at least one indicator; or a portion, of the plurality of portions, on which the at least one indicator is displayed.

The graphic object may comprise a contour indicating a boundary of each of a plurality of objects comprised in the vehicle image, and wherein each of the plurality of indicators is respectively superimposed on one of the plurality of portions, and wherein the plurality of portions are defined by the contour.

The instructions, when executed by the at least one processor, may cause the speech recognition system to determine, as the control target, an object corresponding to the at least one indicator among a plurality of objects comprised in the vehicle image.

A vehicle may comprise: a display; and a controller configured to: control the display to display a vehicle image comprising a plurality of indicators, wherein each of the plurality of indicators is associated with one of a plurality of portions of the vehicle image, and wherein the vehicle image is associated with an utterance of a user of the vehicle; and control, based on an input associated with at least one indicator of the plurality of indicators, a control target corresponding to the at least one indicator, wherein the control target is associated with a component of the vehicle.

The input may comprise at least one of: a further utterance of the user of the vehicle; an utterance of a second user of the vehicle; or a touch input on the display.

These and other features and advantages are described in greater detail below.

BRIEF DESCRIPTION OF THE DRAWINGS

These and/or other aspects of the disclosure will become apparent and more readily appreciated from the following description of various examples, taken in conjunction with the accompanying drawings of which.

DETAILED DESCRIPTION

Figure 1:
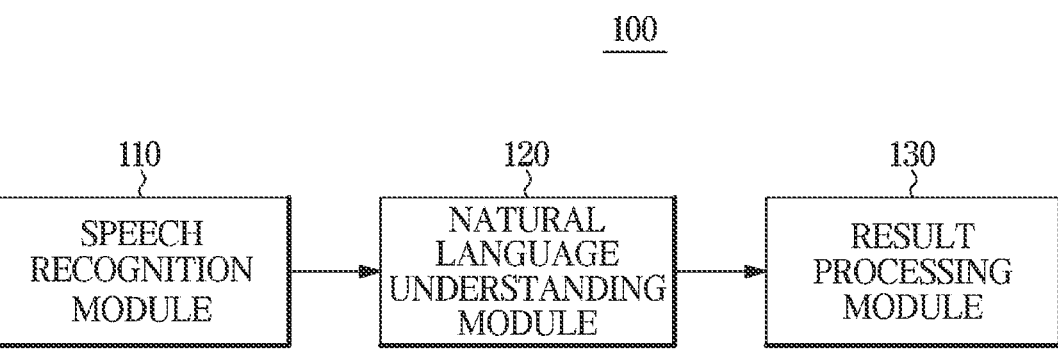
FIG. 1 is a block diagram illustrating a dialogue system.

Various examples set forth herein and illustrated in the configuration of the disclosure are for explanation purpose, so it should be understood that they may be replaced with various equivalents and modifications at the time of the disclosure.

Terminologies used herein may be for the purpose of describing particular examples only and may not be intended to limit the disclosure. It is to be understood that the singular forms are intended to include the plural forms as well, unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

Further, the terms such as "~part", "~device", "~block", "~member", "~module", and the like may refer to a unit for processing at least one operation, function, and/or action. For example, the terms may refer to at least process processed by at least one hardware, such as field-programmable gate array (FPGA)/application specific integrated circuit (ASIC), software stored in memories or processors.

It will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

Various features described herein may be implemented in the form of a recording medium storing computer-executable instructions that are executable by a processor. The instructions may be stored in the form of a program code, and when executed by a processor, the instructions may generate a program module to perform operations of the disclosed features. The recording medium may be implemented as a computer-readable recording medium.

The computer-readable code may be recorded on a medium or transmitted through a communication channel (e.g., the Internet). The medium may include read only memory (ROM), random access memory (RAM), magnetic tapes, magnetic disks, flash memories, and optical recording medium.

Hereinafter, various examples of a vehicle, a speech recognition system, and a method for providing a speech recognition service will be described in detail with reference to the accompanying drawings.

FIG. 1 is a block diagram illustrating a dialogue system.

Referring to FIG. 1, a speech recognition system 1 may include a speech recognition module 110 converting a user's utterance and/or speech into text, a natural language processor (e.g., a natural language understanding module 120) determining a user intention corresponding to the text, and a result processing module 130 generating various result processing signals required to provide a service corresponding to the user intention.

The speech recognition module 110 may be implemented with a speech to text (STT) engine, and perform conversion of the utterance and/or speech into text by applying a speech recognition algorithm to the user's utterance and/or speech.

For example, the speech recognition module 110 may extract feature vectors from the user's utterance and/or speech by applying a feature vector extraction method such as a cepstrum, a linear predictive coefficient (LPC), a Mel frequency cepstral coefficient (MFCC), a filter bank energy, or the like.

A recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

The speech recognition module 110 may convert the user's utterance and/or speech into the text based on a learning process (e.g., in which deep learning or machine learning is applied). However, the method of converting the user's utterance and/or speech into the text by the speech recognition module 110 is not limited thereto, and a variety of speech recognition techniques and/or technologies may be applied to convert the user's utterance and/or speech into the text.

The natural language understanding module 120 may apply a natural language understanding (NLU) technique to determine a user intention associated with the text. Accordingly, the natural language understanding module 120 may include an NLU engine that determines the user intention by applying the NLU technique to an input sentence. For example, the text output by the speech recognition module 110 may be an input sentence input to the natural language understanding module 120.

The natural language understanding module 120 may recognize an entity name from the input sentence. The entity name may be a proper noun such as a name of an individual person, place, organization, time, day, currency, and the like. Named-entity recognition is for identifying an entity name in a sentence and classifying a type of the identified entity. A keyword may be extracted from the sentence through named-entity recognition to understand the meaning of the sentence.

The natural language understanding module 120 may determine a domain from the text. The domain may be for identifying a subject of the user's speech. For example, domains representing various subjects such as vehicle control, schedule, information about weather or traffic conditions, text transmission, navigation, etc., may be determined based on the text.

The natural language understanding module 120 may analyze a speech act of the text. Speech act analysis is for analyzing an intention of speech, such as whether the user asks a question, makes a request, responds, or simply expresses the user's emotion(s).

The natural language understanding module 120 may determine an intent and an entity required to perform the intent, for example, based on the domain, entity name, and speech act extracted from the text. For example, if the text is "turn on the air conditioner", the domain may be a [vehicle control], the intent may be [turn on, air conditioner]. Here, [turn on] may be the action, and [air conditioner] may be the target, the entity required to perform a control operation corresponding to such intent may be [temperature, air volume].

The result processing module 130 may output a result processing signal to a user terminal or an external server to provide a service corresponding to the user intention.

The user terminal may serve as a gateway between the user and the speech recognition system 100. The user terminal may be a mobile device provided with an input/output interface such as a microphone, a speaker, a display, and the like, or be a vehicle itself (e.g., a telematics system of the vehicle). If the user terminal is a mobile device, the vehicle and the mobile device may be connected to each other via a wireless communication, such as Bluetooth®, or via a wired communication, such as a cable connection.

For example, if a service corresponding to a user intention is a vehicle-related control, the result processing module 130 may generate a control signal for performing the corresponding control and transmit the control signal to the user terminal.

If a service corresponding to a user intention is provision of specific information, the result processing module 130 may search for the specific information and transmit the retrieved information to the user terminal. Information retrieval may be performed, for example, by an external server or the vehicle.

If a service corresponding to the user intention is provision of specific content, the result processing module 130 may send a request to an external server providing the corresponding content.

If a service corresponding to the user intention is continuation of a dialogue, the result processing module 130 may generate a response to the user's utterance and output the response as a voice.

The above-described speech recognition system 100 may be implemented with at least one memory storing a program performing the aforementioned operations and at least one processor implementing a stored program.

The constituent components of the speech recognition system 100 may be divided based on their operation or function, and all or a portion of the constituent components may share the memory or at least one processor. For example, the speech recognition module 110, the natural language understanding module 120, and the result processing module 130 are not necessarily physically separated from each other and may be implemented by the same hardware component(s).

Figure 2:
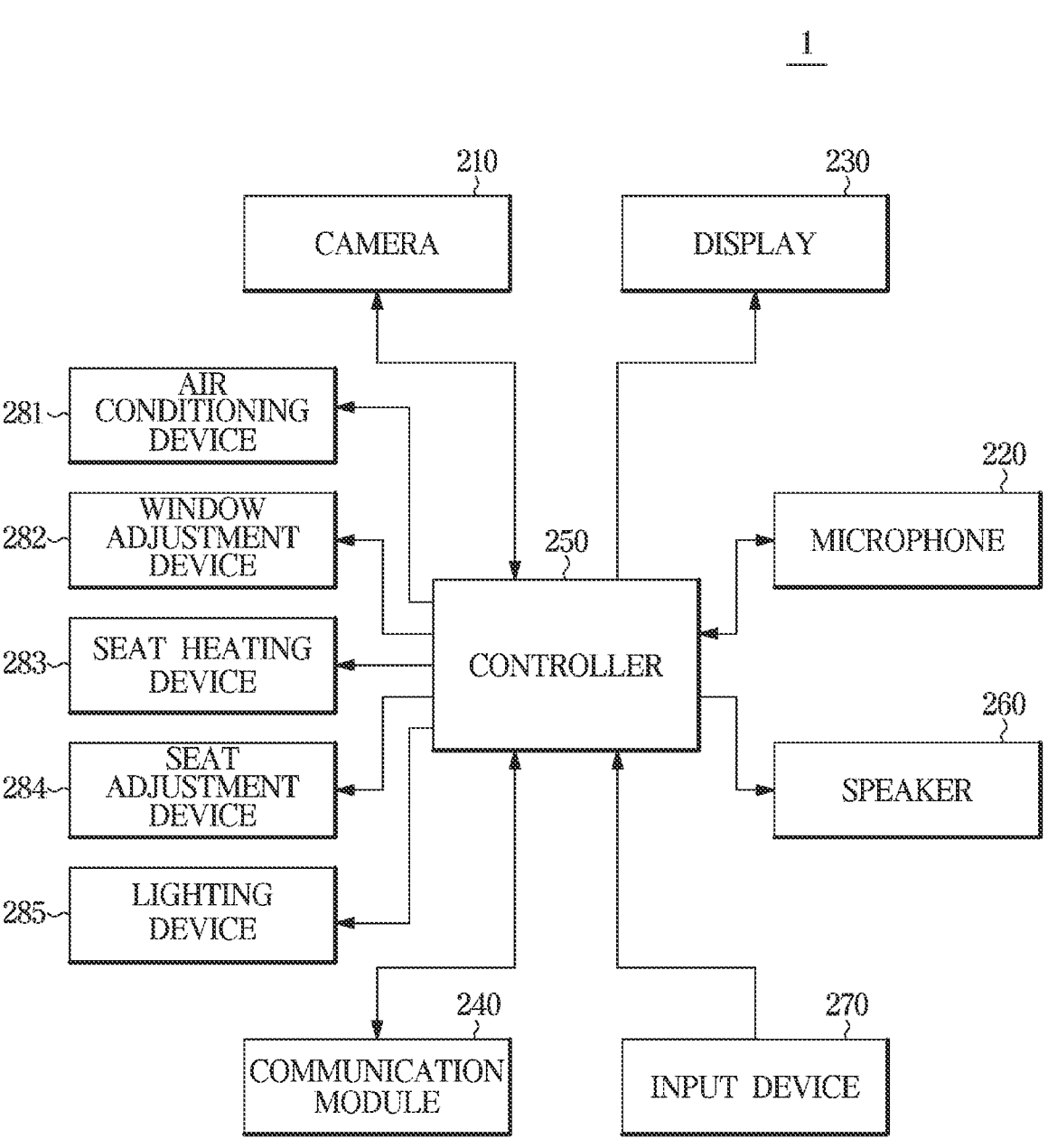
FIG. 2 is a block diagram illustrating a vehicle.
Figure 3:
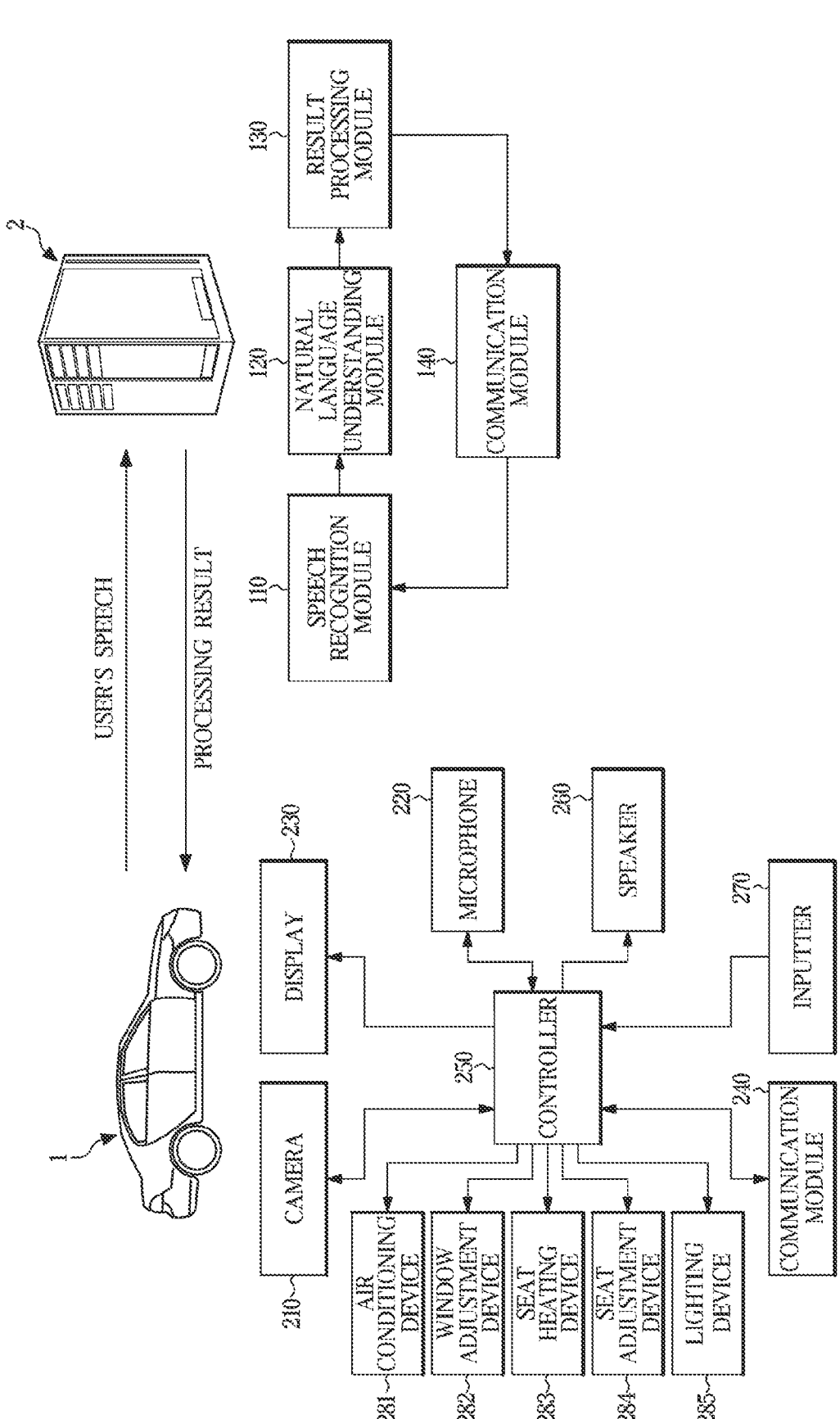
FIG. 3 is a schematic diagram illustrating a system comprising a vehicle and a speech recognition system.

FIG. 2 is a block diagram illustrating a vehicle. FIG. 3 is a schematic diagram illustrating a system comprising a vehicle and a speech recognition system.

Referring to FIG. 2, a vehicle 1 may include a camera 210 capturing a vehicle image, a microphone 220 to which a user's utterance and/or speech is input, a display 230 displaying an image to provide a service requested by a user (e.g., via the utterance and/or speech), a speaker 260 outputting a sound to provide a service requested by the user, a communication module 240 performing communication with one or more external devices, and a controller 250 controlling the above-described components and other components of the vehicle 1. The controller 250 may comprise at least one processor and memory storing instructions that, when executed by the at least one processor, cause the controller 250 to control one or more components of the vehicle 1.

The camera 210 may capture at least one of an inside or an outside of the vehicle 1. Accordingly, the camera 210 may be provided inside the vehicle 1, outside the vehicle 1, or both inside and outside of the vehicle 1.

The microphone 220 may be provided inside the vehicle 1 to receive a user's utterance and/or speech. A user may be a driver or a passenger. The microphone 220 may be provided on a steering wheel, a center fascia, a headliner, a rear-view mirror, etc., to receive an utterance and/or a speech from the user or a passenger on a front seat (e.g., a registered driver or a registered front passenger authorized to control the vehicle).

Two or more microphones 220 may be provided to receive a rear passenger's utterance and/or speech (e.g., speech of a passenger on a rear seat). The microphone 220 for receiving the rear passenger's utterance and/or speech may be provided on an armrest of a front seat or a rear seat, or on a rear seat door, a B-pillar or a C-pillar, etc.

The above positions of the microphone 220 are some examples among various examples and may be applicable to one or more vehicles (e.g., the vehicle 1). The microphone 220 may be positioned anywhere as long as it may effectively receive an utterance and/or a speech from users in each location.

The vehicle 1 may include an input interface (e.g., an input device 270) for manually receiving a user command in addition to the microphone 220. The input device 270 may include an input device in an area where an audio, video, navigation (AVN) is provided on a center fascia, an input device in an area where a gearbox is provided, or an input device provided as a jog shuttle or a button on a steering wheel. To receive a control command related to passenger seats, the input device 270 may include an input device provided on each door of the vehicle 1, or an input device provided on an armrest of a front seat or a rear seat.

The input device 270 may include a touchpad or a touchscreen provided integrally with the display 230.

The display 230 may display a guide image for guiding a user's utterance and/or speech. The guide image displayed on the display 230 will be described in detail later.

The display 230 may include an AVN display provided on a center fascia of the vehicle 1, a cluster display, a head-up display (HUD), etc. The display 230 may include a rear seat display provided on a rear side of the front seat's headrest so that a rear passenger may see the rear seat display. If the vehicle 1 is a multi-seater vehicle, the display 230 may include a display mounted on a headliner of the vehicle The display 230 may be provided anywhere as long as users inside the vehicle 1 may see the display 230, and the position or the number of displays 230 may vary according to various implementations.

The communication module 240 may transmit and receive information to and from other devices by using at least one of various wireless communication methods such as Bluetooth®, 4G, 5G, Wi-Fi, and the like. The communication module 240 may transmit and receive information to and from other devices via a wired communication, such as via a cable connected to a USB terminal, an AUX terminal, and the like.

For example, the communication module 240 may communicate with a mobile device located in the vehicle 1, thereby receiving information (user images, user speech, contact numbers, schedules, etc.) obtained by or stored in the mobile device. The communication module 240 may communicate with a server 2, thereby transmitting a user's speech and receiving a signal to provide a service requested by the user. The communication module 240 may transmit and receive a signal to and from the server 2 via a mobile device connected to the vehicle 1.

The vehicle 1 may include an air conditioning device 281 for adjusting an indoor temperature, a window adjustment device 282 for opening/closing vehicle windows, a seat heating device 283 for heating seats, a seat adjustment device 284 for adjusting a position, height, and/or angle of a seat, and a lighting device 285 for adjusting an indoor illuminance level.

The aforementioned components may be for providing convenience functions related to the vehicle 1, and a portion of the components may be omitted depending on models or options of a vehicle. Additional components may be further included in the vehicle 1 in addition to the above described components.

The controller 250 may turn on or off the camera 210 and may turn on or off the microphone 220. The controller 250 may process and/or store an image captured by the camera 210 and may process and/or store a voice input to the microphone 220. The controller 250 may transmit the image and/or the voice to another device via the communication module 240.

The controller 250 may control the display 230 to display an image, and control the speaker 260 to output a sound.

The controller 250 may perform various controls related to the vehicle 1. For example, the controller 250 may control at least one of the air conditioning device 281, the window adjustment device 282, the seat heating device 283, the seat adjustment device 284, and/or the lighting device 285, for example, according to a user command input via the input device 270 and/or the microphone 220.

The controller 250 may include at least one memory storing a program performing the aforementioned operations or operations to be described later and at least one processor executing instructions of a stored program.

Referring to FIG. 3, the speech recognition system 100 may be provided in the server 2 (and/or the vehicle 1). A user's utterance and/or speech input to the vehicle 1 may be transmitted (e.g., as a voice signal) to a communication module 140 of the server 2, and if the voice signal is processed by the speech recognition system 100 provided in the server 2, the communication module 140 may transmit a processing result back to the vehicle 1.

In some implementations, a portion of the components of the speech recognition system 100 may be provided in the vehicle 1, and the other components may be provided in the server 2.

For example, the speech recognition module 110 may be provided in the vehicle 1, and the natural language understanding module 120 and the result processing module 130 may be provided in the server 2.

As another example, the speech recognition module 110 and the result processing module 130 may be provided in the vehicle 1 and the natural language understanding module 120 may be provided in the server 2, or the speech recognition module 110 and the natural language understanding module 120 may be provided in the server 2 and the result processing module 130 may be provided in the vehicle 1.

As still another example, the speech recognition system 100 may be provided in the vehicle 1.

Although all or a portion of the components of the speech recognition system 100 may be provided in the vehicle 1 as described above, an example where the speech recognition system 100 is provided in the server 2, as shown in FIG. 3, will be described below.

In order for a user to input a control command by voice, the name of to control target may be required to be uttered accurately. However, many users may not be familiar with the exact names of various components of the vehicle 1. If a control target is not clearly specified by a user's utterance or speech, a system response for inducing a user's subsequent speech may be output and the user may need to provide a subsequent utterance or speech according to the output system response to better indicate/specify the control target.

A guide image may be displayed on a display so that a user who is not aware of the exact name of the control target may easily utter the name of the control target and provide an input for a command associated with the control target, which is described in detail with reference to figures.

Figure 4:
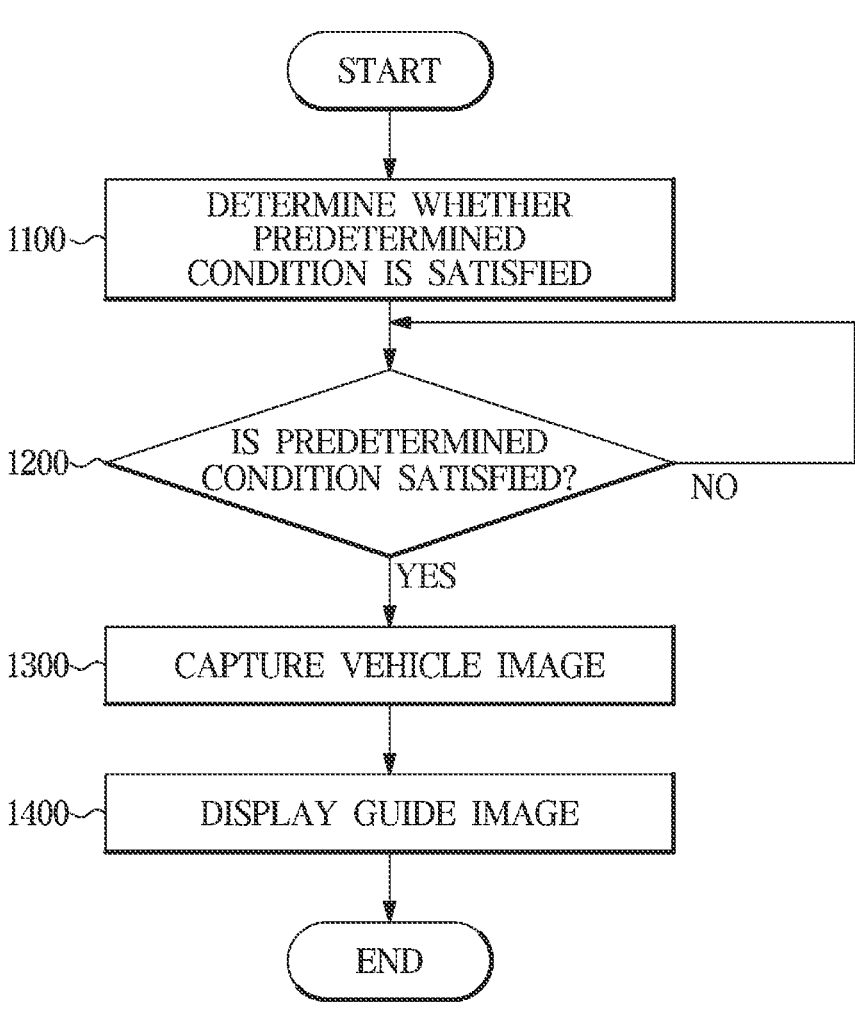
FIG. 4 is a flowchart illustrating a method for providing a speech recognition service.

FIG. 4 is a flowchart illustrating a method for providing a speech recognition service. The method for providing a speech recognition service may be performed by the vehicle 1 or the speech recognition system 100. Additionally or alternatively, a portion of operations of the method for providing a speech recognition service may be performed by the vehicle 1 and the other operations of the method for providing a speech recognition service may be performed by the speech recognition system 100.

Referring to FIG. 4, whether a predetermined condition is satisfied may be determined to capture a guide image (1100).

For example, if a user's subsequent speech is required to specify a control target, if a user requests a guide image, and/or if a context requiring a control for a specific control target occurs, it may be determined that the predetermined condition is satisfied. Alternatively or additionally, if a control target is specified by a user's utterance or speech, a guide image including the control target may be captured. In this case, the user may input an additional control command for another component in addition to the control target intended at first by the user.

Whether the predetermined condition is satisfied may be determined by the result processing module 130 of the speech recognition system 100 and/or the controller 250 of the vehicle 1.

For instance, if a user's speech, "turn on the rear seat heater" is input to the microphone 220, whether a control target is a rear left seat heater or rear right seat heater may not be specified. Accordingly, a user's subsequent speech to specify whether the control target is a rear left seat heater or rear right seat heater may be required, and it may be determined that the predetermined condition is satisfied.

As another example, if the user requests a guide image by inputting a user's utterance or speech, "show me a rear seat", to the microphone 220, it may be determined that the predetermined condition is satisfied.

As still another example, if a context requiring a control for a specific control target occurs, e.g., when entering a tunnel with a window (including a sunroof) open, when driving with a trunk open, when a control command for a passenger seat is input to the input device 270, when a rear seat display is turned on, when a drowsy driving is detected (e.g., the driver is sleepy), and/or when an in-vehicle environment deviates from a preset condition, it may be determined that the predetermined condition is satisfied.

As yet another example, if a user's speech, "turn on a rear right seat heater", is input to the microphone 220, even though the control target is specified as the 'rear right heater' by the user's speech, it may be determined that the predetermined condition is satisfied and a guide image including a rear right seat may be captured.

If the predetermined condition is satisfied (Yes in operation 1200), a vehicle image may be captured by the camera 210 or a stored vehicle image may be retrieved (1300).

The vehicle image may be an image of an inside or an outside of the vehicle 1. The vehicle image may include at least one control target candidate. The at least one control target candidate may refer to a candidate that may be a control target associated with the user's utterance or speech. The at least one control target candidate may be determined by an input of the user's utterance or speech, or based on a generated context associated with the user's utterance or speech.

If a control target has been already specified by a user's utterance or speech, a vehicle image including the specified control target and surroundings of the specified control target may be captured or retrieved. In this case, the surroundings of the specified control target may be the control target candidate.

If the vehicle image is captured or retrieved, the guide image may be displayed on the display 230 (1400).

The guide image for guiding the user after receiving a user's utterance or speech may be an image comprising an indicator corresponding to the control target candidate is superimposed on the vehicle image (e.g., captured by the camera 210 or retrieved from a storage). Examples of the guide image will be described in greater detail later.

The user may utter one or more words indicating a control target by viewing the guide image displayed on the display 230, and the speech recognition system 100 may specify and/or identify the control target based on the input user's utterance or speech.

Hereinafter, operations of the method for providing a speech recognition service are described with various examples.

Figure 5:
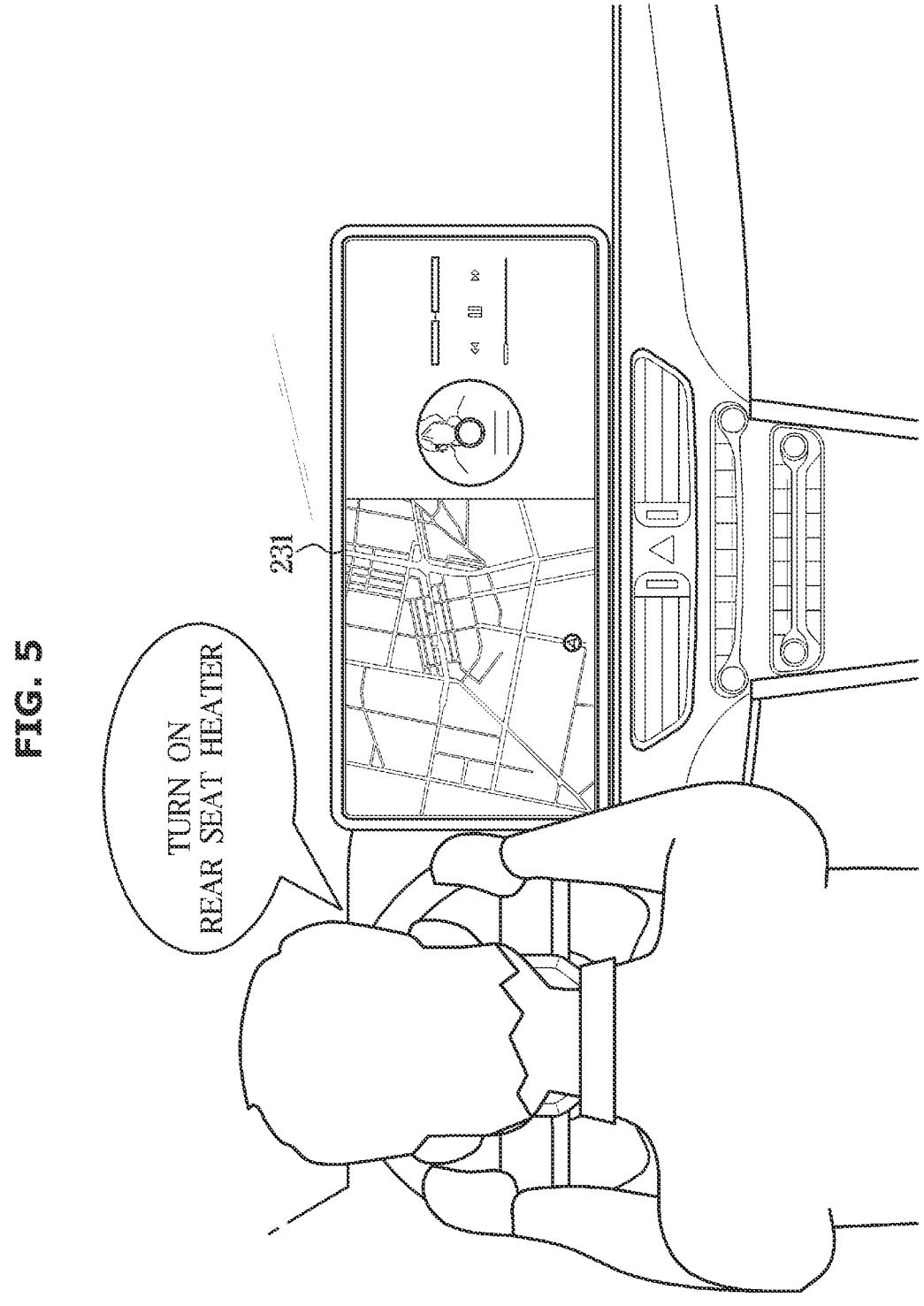
FIG. 5 is a diagram illustrating an example of a user's speech input to a vehicle according to an embodiment.
Figure 6:
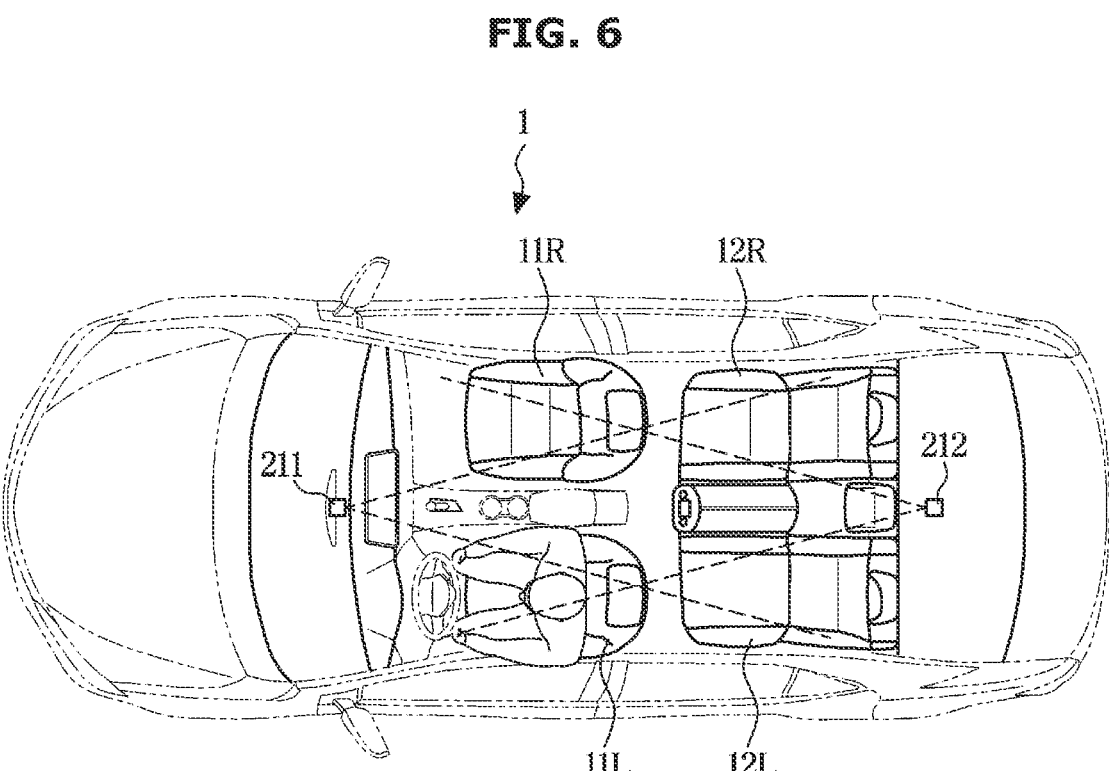
FIG. 6 is a diagram illustrating an example of positions of cameras provided in a vehicle.
Figure 7:
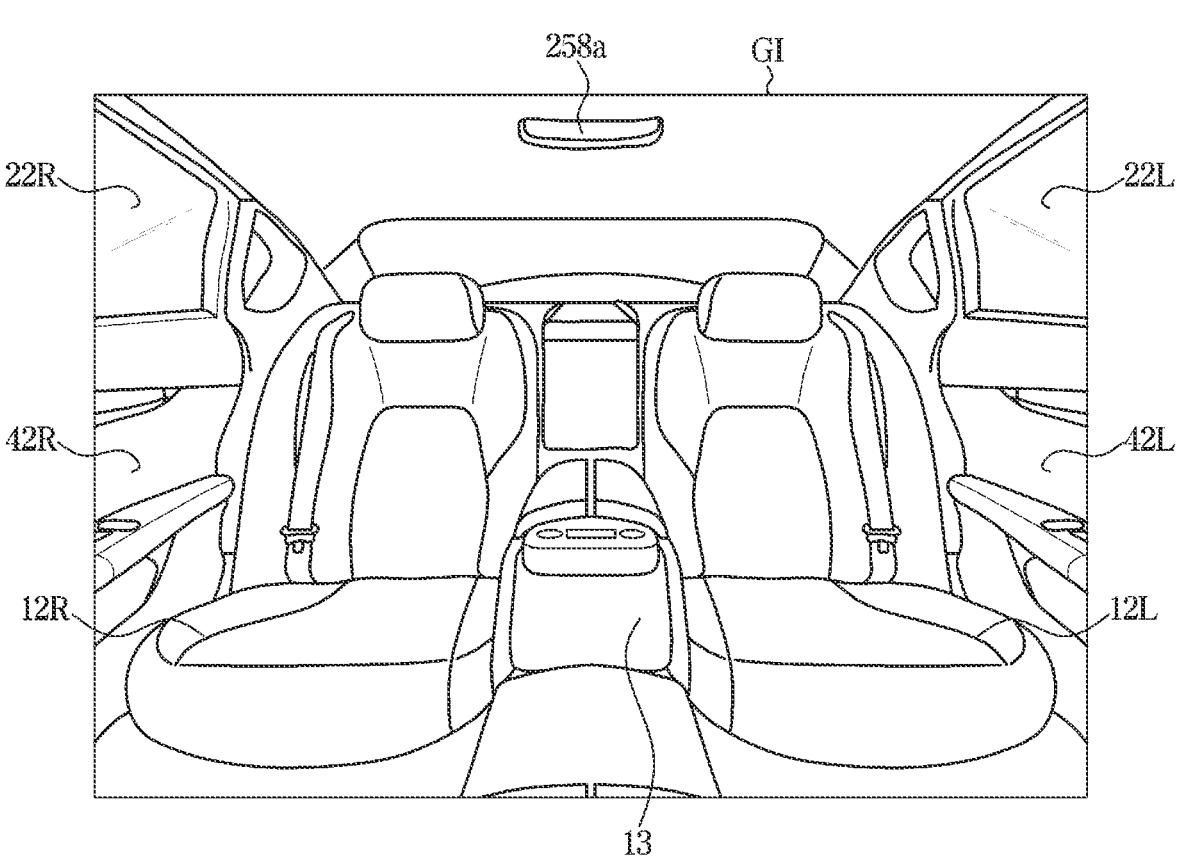
FIGS. 7 and 8 are diagrams illustrating examples of images captured by a camera of a vehicle.
Figure 8:
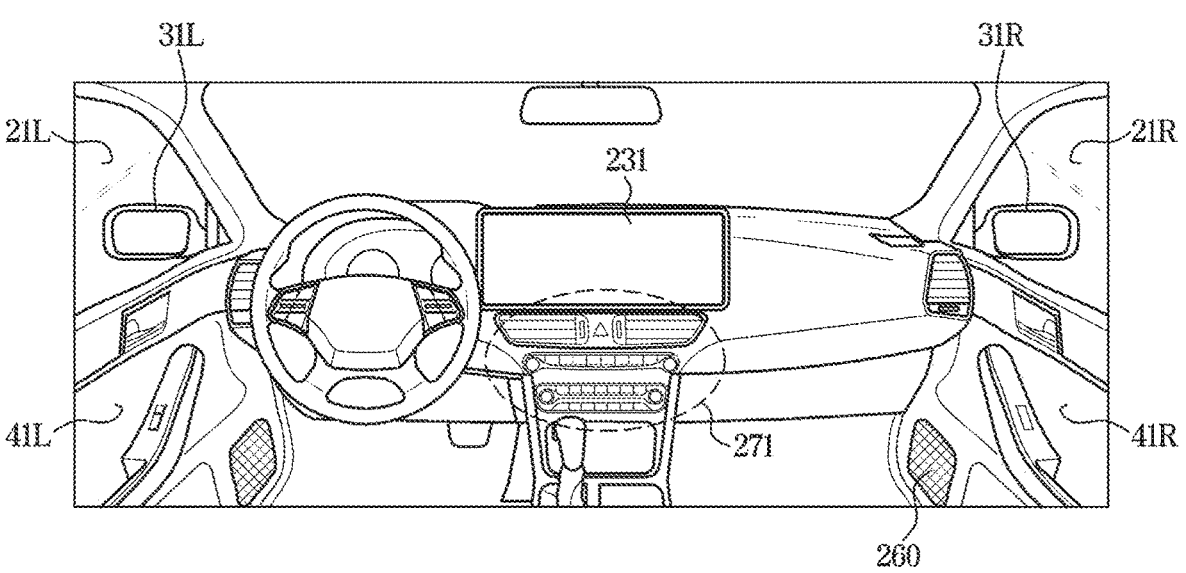

FIG. 5 is a diagram illustrating an example of a user's speech input to a vehicle. FIG. 6 is a diagram illustrating an example of positions of cameras provided in a vehicle. FIGS. 7 and 8 are diagrams illustrating examples of images captured by a camera of a vehicle.

As described above, the predetermined condition to capture a vehicle image may be satisfied, for example, if a user's subsequent speech is required to specify a control target. As shown in FIG. 5, if a user's speech, "turn on the rear seat heater", is input, the speech recognition module 110 may convert the input speech into text, and the natural language understanding module 120 may analyze the text and determine that an intent is [turn on, seat heater].

In the user's speech, a target of the intent indicating a control target, i.e., 'rear seat', in this example may be a rear left seat, rear right seat, or both left and right rear seats.

However, it may be unclear whether the user intends to turn on the rear left seat heater, rear right seat heater, or both left and right rear seat heaters, and the user's speech may not be sufficient to specify more detailed control target(s). The user's initial utterance and/or speech may be associated with a plurality of control target candidates (e.g., a rear left seat heater, a rear right seat heater, or both rear seat heaters) derived from one or more elements of the user's initial utterance and/or speech (e.g., a rear seat heater).

Accordingly, a user's subsequent speech and/or a subsequent user input may be required to specify the control target intended by the user. In this instance, it may be determined that the predetermined condition to output a guide image is satisfied. As described above, such a determination may be performed by the result processing module 130 of the speech recognition system 100 and/or the controller 250 of the vehicle 1 that receives an analysis result of the natural language understanding module 120. The guide image may include the plurality of control target candidates.

Context information may be used to specify a control target among the plurality of control target candidates. For example, if the rear right seat is occupied by a passenger but the rear left seat is not occupied by a passenger, the guide image may indicate that the rear right seat heater is selected as the control target. The occupancy of each seat may be detected by using a camera and/or by using a status of a component of the vehicle (e.g., the seat belt of the rear right seat is fastened).

A previous user selection (e.g., user's subsequent utterances and/or touch inputs) responsive to a previous user utterance (e.g., a user utterance "turn on the rear seat heater" received two weeks ago) may be identified and displayed as part of the guide image. The previous user selection may be selected a default user selection in response to the current user utterance (e.g., a user utterance "turn on the rear seat heater" currently received) that is similar to the previous user utterance, for example, the user does not provide a subsequent utterance and/or a touch input to select a control target within a certain time period (e.g., five seconds).

If the predetermined condition is satisfied, the controller 250 may control the camera 210 to capture the vehicle image or may retrieve a stored vehicle image.

Referring to FIG. 6, the camera 210 may include a first camera 211 and a second camera 212. The first camera 211 may be mounted in a front area inside the vehicle 1 (e.g., on a rear-view mirror, a front headliner, a front windshield or a center fascia) to capture a rear interior of the vehicle 1, and the second camera 212 may be mounted in a rear headliner or a rear windshield to capture a front interior of the vehicle 1.

As shown in FIG. 7, the first camera 211 (e.g., a front cabin camera) may capture the rear interior of the vehicle 1 including a rear left seat 12L, a rear right seat 12R, an armrest 13 between the rear left seat 12L and the rear right seat 12R, and the like. A rear left window 22L and a rear right window 22R may be captured depending on a view angle of the first camera 211. A rear interior image RI captured by the first camera 211 may include an image of the rear interior of the vehicle 1.

As shown in FIG. 8, the second camera 212 may capture the front interior of the vehicle 1 including an AVN display 231 provided in a center fascia, a control panel 271, a front right window 21R, a front left window 21L, a front left door 41L, a front right door 41R, the speaker 260, and the like. A front interior image FI captured by the second camera 212 may include an image of the front interior of the vehicle 1.

However, the above-described positions or the number of cameras 210, and spaces shown in the front interior image FI or the rear interior image RI are for illustration purpose, and aspects of the present disclosure are not limited thereto.

As another example, the camera 210 may be rotatably disposed at the center of a headliner. If a control target candidate is located in the rear interior of the vehicle 1, the camera 210 may rotate toward the rear (e.g., rotate at a first rotation angle to capture the image of the rear interior of the vehicle 1) to capture the image of the rear interior of the vehicle 1, and if a control target candidate is located in the front interior of the vehicle 1, the camera 210 may rotate toward the front (rotate at a second rotation angle the image of the front interior of the vehicle 1) to capture the image of the front interior of the vehicle 1.

The image captured by the camera 210 based on the predetermined condition is satisfied may include the control target candidate. In the example of FIGS. 5-7, the control target candidate may be the rear right seat 12R and the rear left seat 12L. Accordingly, the camera 210 may be controlled to capture the rear interior in which the rear right seat 12R and the rear left seat 12L are located. According to the example of FIG. 6, the first camera 211 may be controlled.

Which image is to be captured by the camera 210 may be determined by the controller 250 or the result processing module 130 of the speech recognition system 100.

The controller 250 may display the guide image by superimposing an indicator for displaying the control target candidate on the captured vehicle image.

FIGS. 9 to 12 are diagrams illustrating examples of a guide image displayed in a vehicle.

Figure 9:
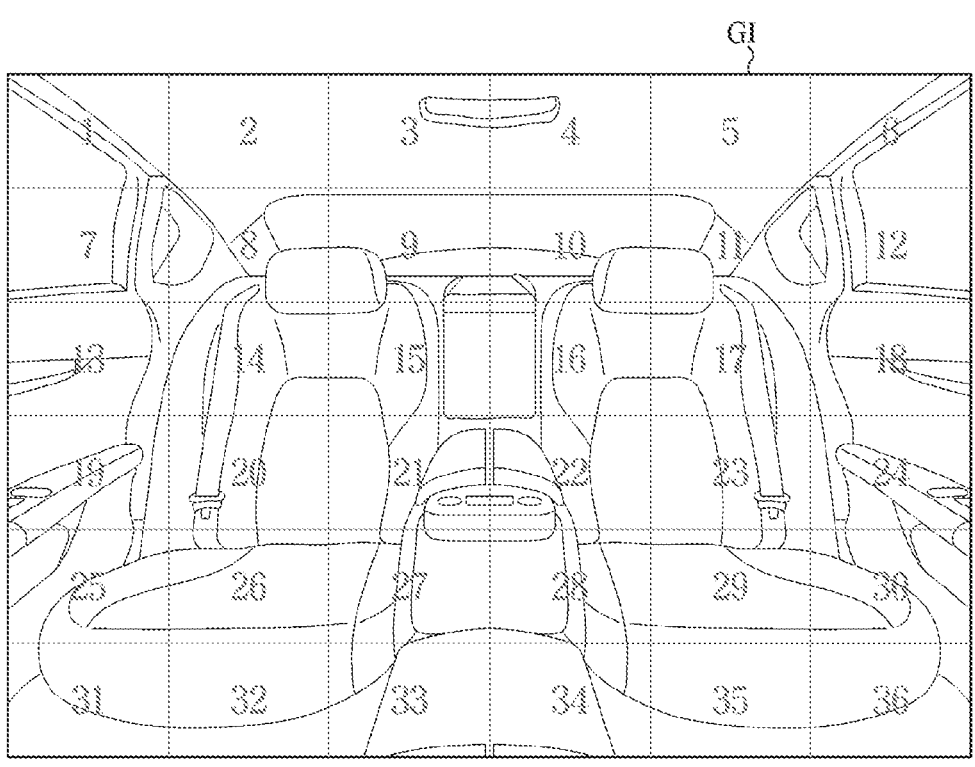
FIGS. 9 to 12 are diagrams illustrating examples of a guide image displayed in a vehicle.
Figure 10:
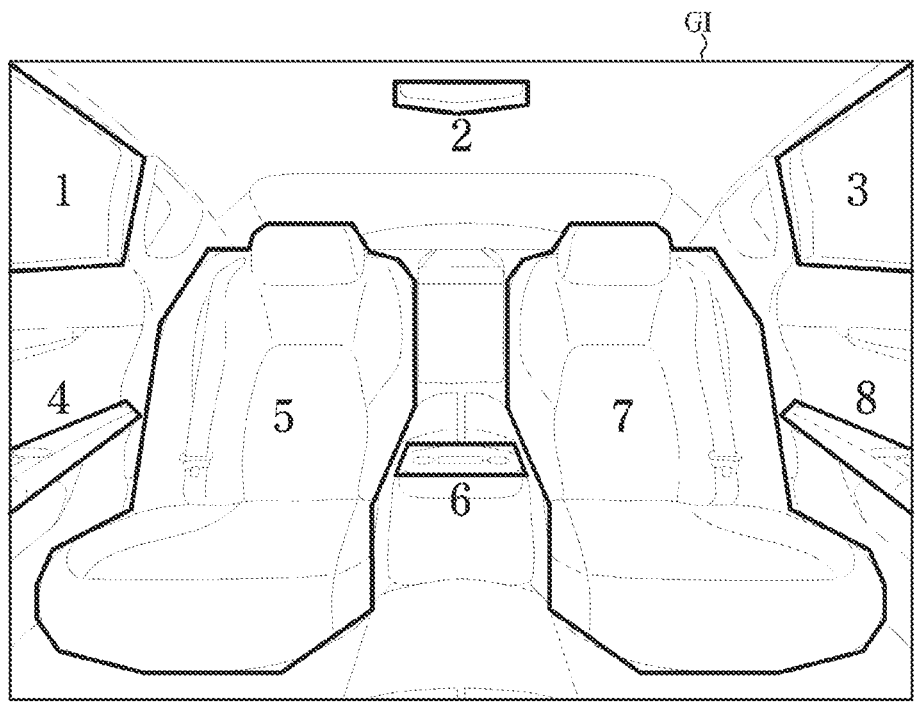

As described above, a vehicle image captured by the camera 210 (e.g., based on a predetermined condition is satisfied) may include a control target candidate. If the control target candidate is the rear right seat 12R and the rear left seat 12L, the camera 210 may be controlled to capture a rear interior in which the rear right seat 12R and the rear left seat 12L are located, as shown in FIGS. 9 and 10. If the camera 210 includes the first camera 211 and the second camera 212, a photographing signal may be transmitted to the first camera 211 capture the rear interior of the vehicle 1. If the camera 210 is rotatably disposed, the camera 210 may be controlled to rotate at a first rotation angle to capture the image of the rear interior of the vehicle 1.

Referring to FIG. 9, the controller 250 may display the vehicle image (e.g., captured by the camera 210) on the display 230 by overlaying/superimposing a two-dimensional (2D) grid on the vehicle image. The controller 250 may display an indicator (e.g., used to indicate each block) on each of the blocks divided by the 2D grid. For example, the guide image GI may include the vehicle image, and the grid and indicator superimposed on the vehicle image.

The indicator displayed on each block may be a number or a character such as an alphabet or Hangul which is Korean alphabet or any other indicators or symbols. A type of indicator is not limited to a number, character, or figure, as long as a user may easily recognize and make an utterance from the guide image GI. Additionally or alternatively, the user may select any indicator (e.g., by touching the screen of the display 230 or any other user interface).

Different indicators may be displayed on a plurality of blocks divided by the 2D grid. In the example of FIG. 9, numbers from 1 to 36 are displayed as indicators. However, an indicator may not be displayed in every block, and an indicator may be displayed only in a block related to a control target candidate or in a block in which a controllable component is located. For example, a vehicle portion corresponding to number 2 (e.g., a headliner) may not be a controllable component while a vehicle portion corresponding to number 26 (e.g., a portion of a rear right seat) may be a controllable component.

Also, the indicator displayed in the block related to the control target candidate or in the block in which a controllable component is located may be displayed differently from the other indicators. When the former indicator is referred to as a first indicator (e.g., controllable part indicators) and the latter indicators are referred to as a second indicator (e.g., uncontrollable part indicators), the first indicator may be displayed bolder, larger or brighter than the second indicator, or the first and second indicators may be displayed in different colors. A manner of distinguishing the first and second indicators is not limited, as long as the first indicator is distinguishable from the second indicator and is intuitively displayed to be selectable.

The controller 250 and/or the result processing module 130 may perform an image processing for the vehicle image, so that the controller 250 and/or the result processing module 130 may recognize an object displayed on the vehicle image. For example, an object displayed on the vehicle image, such as a window, seat, door, lighting, armrest, etc., may be recognized by applying an object recognition algorithm.

The object recognition algorithm applied herein may be a deep learning-based algorithm, a machine learning-based algorithm, and/or any other object recognition algorithm. Specifically, one of one-stage detector algorithm, which simultaneously performs classification and regional proposal, or a two-stage detector algorithm, which sequentially performs classification and regional proposal, may be applied.

The two-stage detector may use a region with convolution neural network (R-CNN), a Fast R-CNN, or a Faster R-CNN, and the one-stage detector may use a You only look once (YOLO), a single shot multibox detector (SSD) or ReinaNet.

However, the above object recognition techniques are several examples applicable to the features described herein, and a variety of other object recognition techniques may be used to recognize an object of the vehicle image.

As shown in FIG. 10, the controller 250 and/or the result processing module 130 may display a contour of a recognized object (e.g., in bold lines) to be distinguishable from other objects, and display different indicators for each recognized object.

If a control target candidate is located in a front area inside the vehicle 1, the camera 210 may be controlled to capture the front interior of the vehicle 1. If the camera 210 includes the first camera 211 and the second camera 212, a photographing signal may be transmitted to the second camera 212 to capture the front interior of the vehicle 1. If the camera 210 is rotatably disposed, the camera 210 may be controlled to rotate at a second rotation angle to capture the front interior of the vehicle 1.

Figure 11:
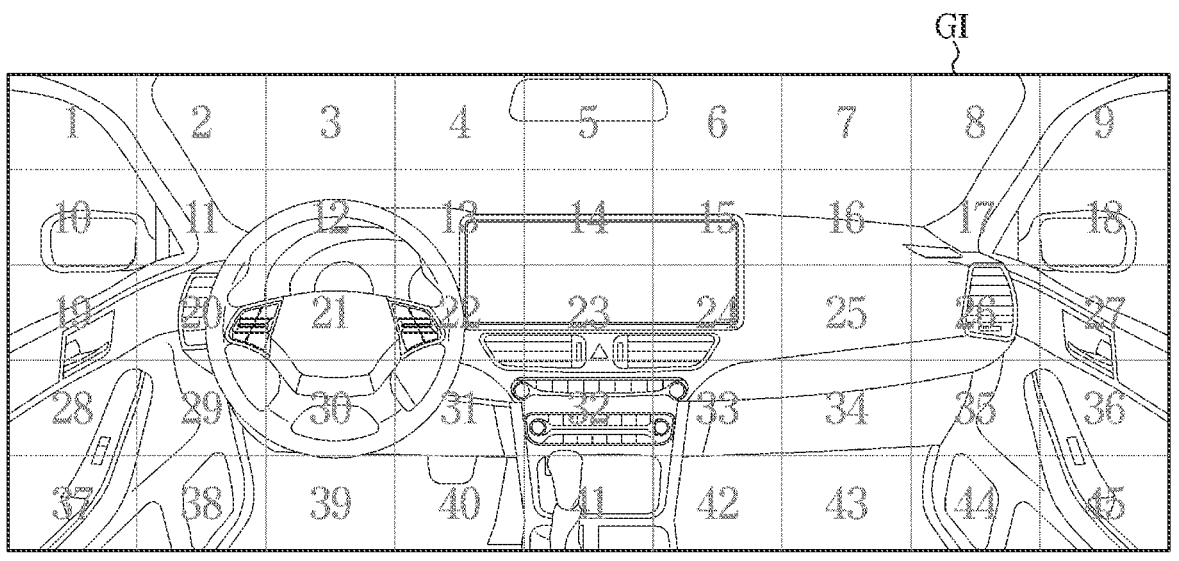

An operation of displaying a guide image GI using a captured vehicle image may be the same as the examples illustrated in FIGS. 9 and 10. For example, as shown in FIG. 11, the captured vehicle image may be displayed on the display 230, and a 2D grid and indicators used to indicate each block may be displayed by being overlaid/superimposed on the vehicle image. Like the above-described example of FIG. 9, the guide image GI may include the vehicle image, and the grid and the indicators overlaid/superimposed thereon.

As described above with reference to FIG. 10, objects displayed in the vehicle image may be recognized by applying an object recognition algorithm, and the recognized objects may be displayed to be distinguishable from each other.

Figure 12:
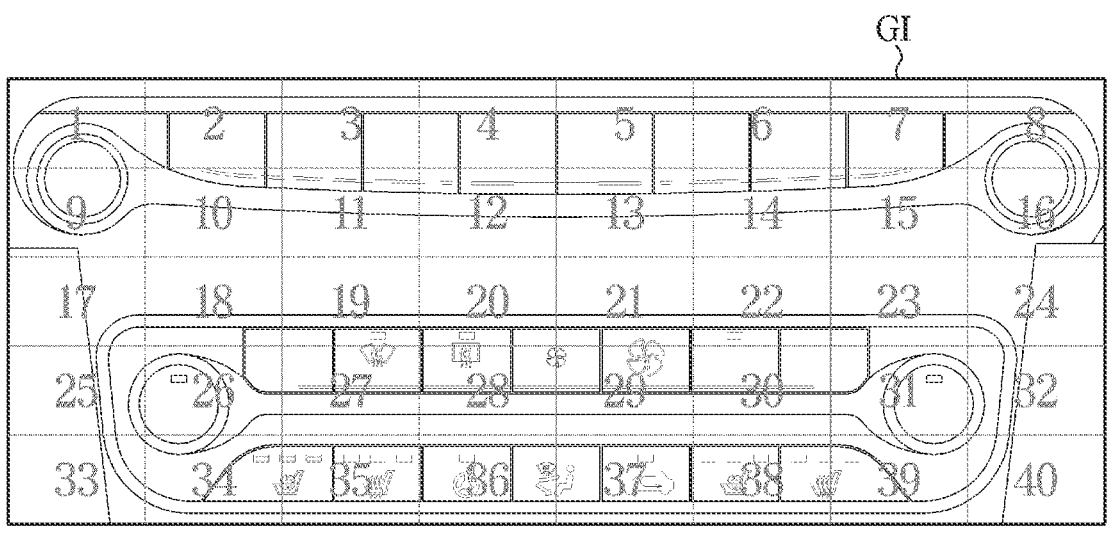

If a control target candidate is located in an area in which a plurality of input devices (e.g., including input buttons included in a small area) are located, such as a control panel 271 on a center fascia, the corresponding area may be enlarged and displayed as shown in FIG. 12. The camera 210 may magnify and capture the corresponding area, and a vehicle image may be enlarged and displayed after cropping the captured (or retrieved) vehicle image in a state where a magnification of the camera 210 is fixed. Similar to FIG. 10, each input button shown in FIG. 12 may be distinguished from other input buttons. The controller 250 and/or the result processing module 130 may display a contour of a recognized object (e.g., in bold lines) to be distinguishable from other objects (e.g., other input buttons), and display different indicators for each recognized object.

Figure 13:
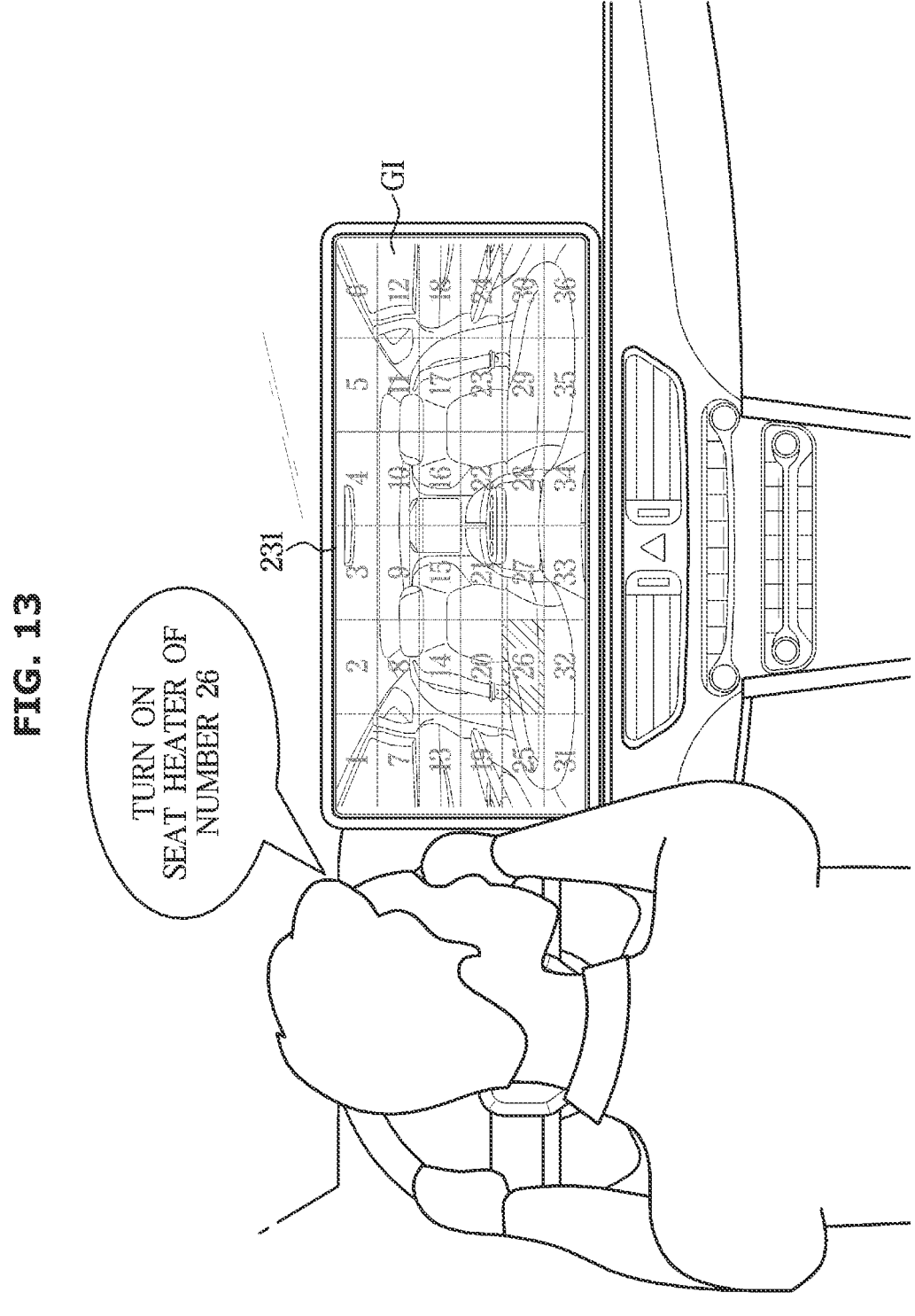
FIG. 13 is a diagram illustrating an example of a user's speech after a guide image is displayed in a vehicle.
Figure 14:
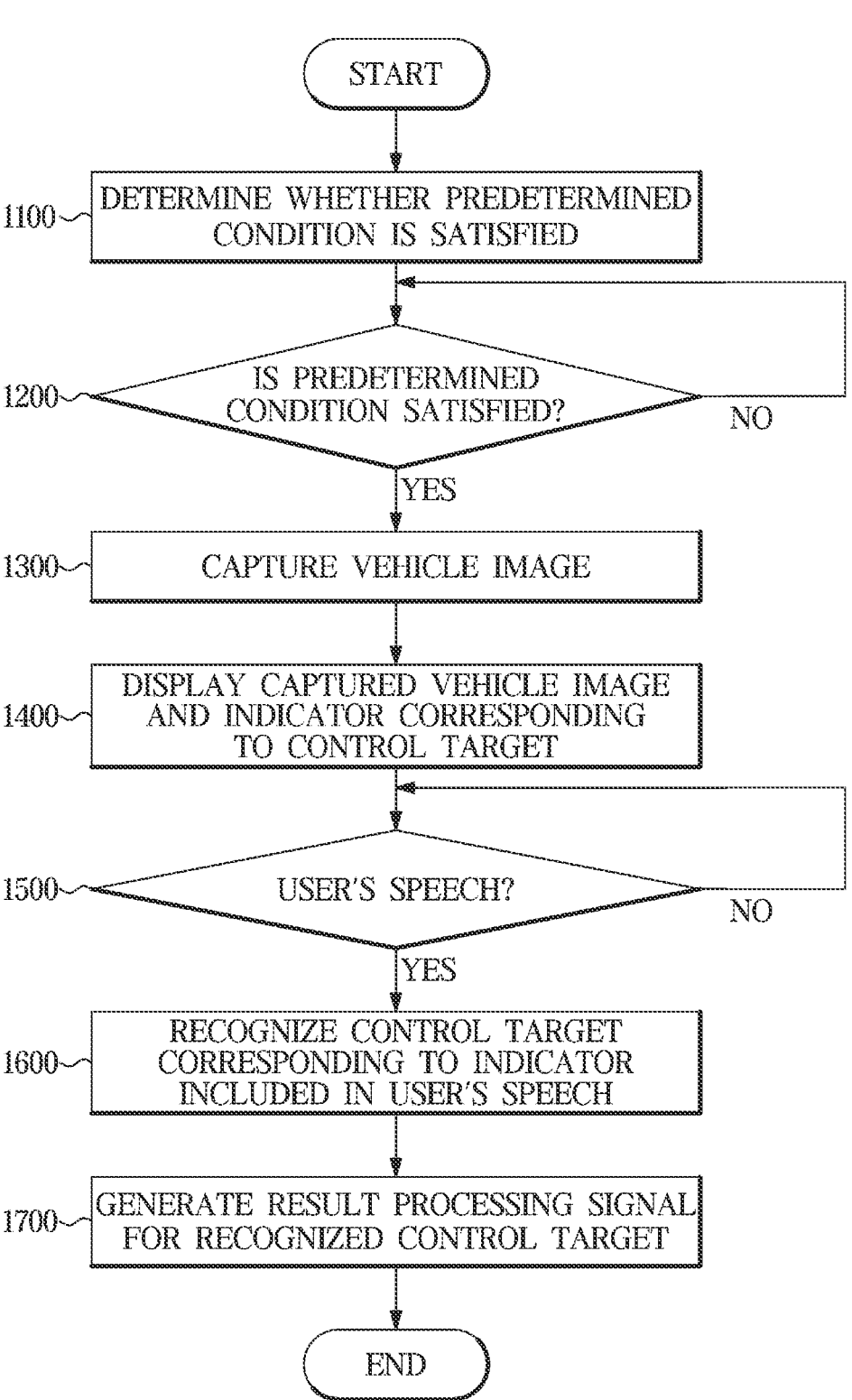
FIG. 14 is a flowchart illustrating a method for providing a speech recognition service.
Figure 15:
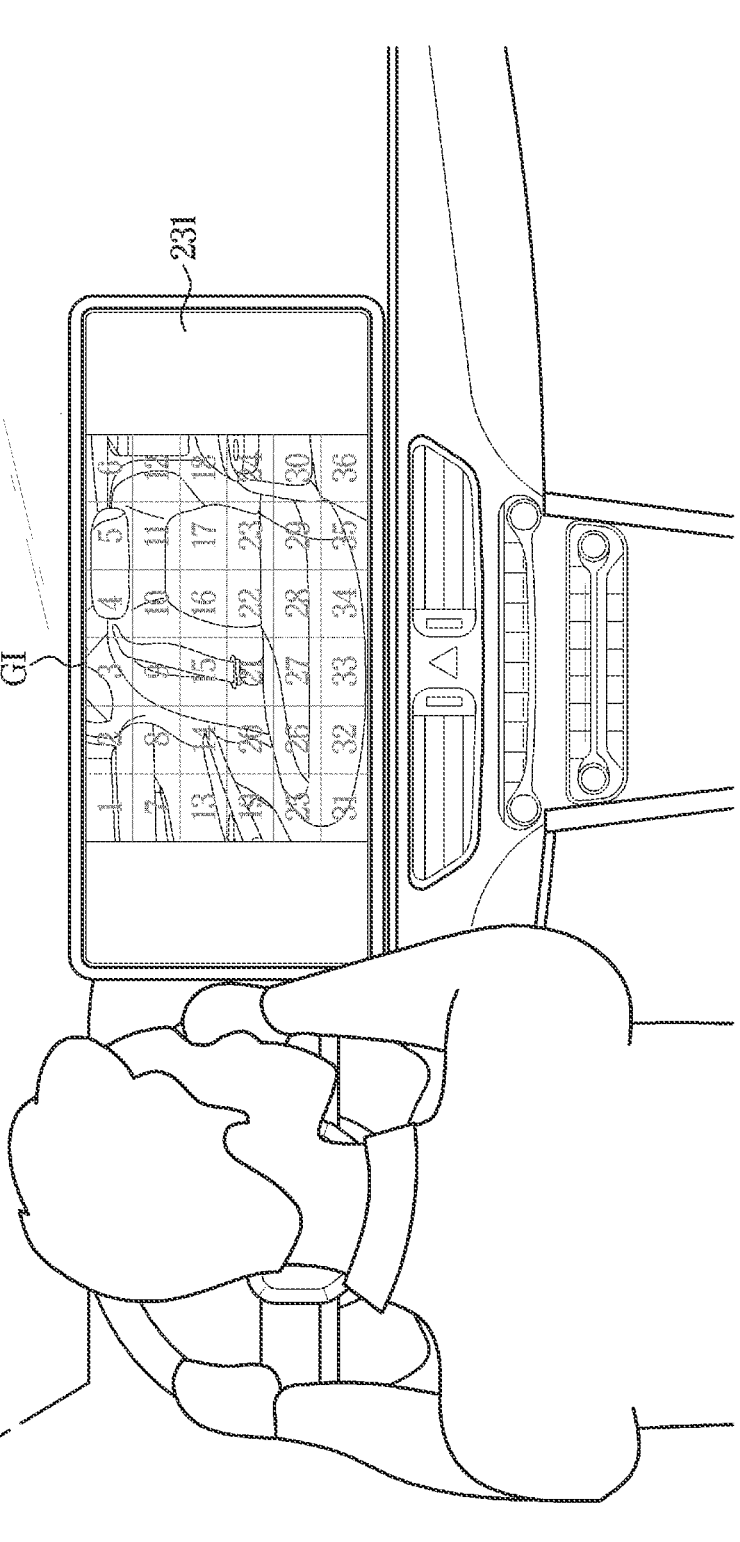
FIG. 15 is a diagram illustrating a guide image enlarged after a user's speech, in a vehicle.

FIG. 13 is a diagram illustrating an example of a user's speech after a guide image is displayed in a vehicle. FIG. 14 is a flowchart illustrating a method for providing a speech recognition service. FIG. 15 is a diagram illustrating a guide image enlarged after user's speech.

Referring back to FIG. 5, if the user's utterance or speech, "turn on the rear seat heater", is input, a guide image GI may be displayed on the AVN display 231, as shown in FIG. 13. However, displaying the guide image GI on the AVN display 231 is an example among various examples, and the guide image GI may be displayed on any display 230 provided in the vehicle 1 such as a cluster display, HUD, and the like.

If a control target intended by a user is a 'rear right heater', the user may utter an indicator 26 displayed on the rear right heater in the guide image GI.

As shown in FIG. 13, the user may utter "turn on the seat heater of No. 26", or utter only the indicator "26" indicating the control target, without additionally uttering words included in the previously uttered command. Additionally or alternatively, the user may touch the screen of the AVN display 231 corresponding to the indicator "26" to select the seat heater of No. 26.

Referring to FIG. 14, descriptions from the operation of determining whether the predetermined condition is satisfied (in operation 1100) to the operation of displaying the vehicle image and indicators (in operation 1400) may be the same as described above.

As shown in FIG. 13, if a user's utterance or speech is input (Yes in operation 1500) after viewing the guide image GI displayed on the display 230, the controller 250 and/or the result processing module 130 may recognize a control target corresponding to an indicator associated with the user's utterance or speech (e.g., an indicator included in the user's utterance or speech) (1600).

A position in an image captured by the camera 210 and a position in a real world may be mapped to each other through calibration performed in advance. For example, the image captured by the camera 210 may be a vehicle image of an inside or an outside of the vehicle 1, and thus positions in the vehicle image may be mapped to components of the vehicle 1, respectively, through calibration.

In the example of FIG. 13, a position of the indicator 26 overlaid/superimposed on the image captured by the camera 210 may be mapped to the rear right seat 12R of the vehicle 1 in the real world, and a position of an indicator 29 may be mapped to the rear left seat 12L of the vehicle 1 in the real world.

A position of an indicator 7 may be mapped to the rear right window 22R of the vehicle 1 in the real world, and a position of an indicator 12 may be mapped to the rear left window 22L of the vehicle 1 in the real world.

A position of a part of the vehicle 1 in the real world mapped to each indicator or to a block on which each of the indicators is displayed may be a control target corresponding to an indicator.

The above-described mapping information may be stored in a memory of the speech recognition system 100 and/or the vehicle 1. If one of the indicators displayed in the guide image GI is uttered by the user, the result processing module 130 and/or the controller 250 may recognize a control target corresponding to the uttered indicator, for example, based on the pre-stored mapping information.

Alternatively or additionally, if the guide image GI is generated by performing image processing such as an object recognition algorithm, etc., an indicator corresponding to each recognized object may be mapped and stored. An indicator corresponding to a recognized object may refer to an indicator displayed by being overlaid/superimposed on the recognized object, and such mapping information may be stored in the memory of the speech recognition system 100 and/or the vehicle 1. For example, image processing and storing the mapping information may be performed in real time, for example, after a predetermined condition is satisfied and a vehicle image is captured.

A control target corresponding to an indicator may be recognized based on image data stored in an external server. For example, if both image data of a vehicle of the same type and the same model as the vehicle 1, and information about types of components shown in a corresponding image are stored in an external server providing a search engine, a control target may be recognized by comparing the image data and a captured vehicle image, e.g., blocks indicated by indicators.

If image data stored in an external server is used, a control target may be immediately specified according to a similarity associated with the stored image data (e.g., a similarity between a control target in the stored image and an indicator associated with an utterance or speech), or a confirmation process may be performed to specify the control target. For example, if a similarity associated with an object included in a stored image is greater than or equal to a reference value, a control target may be specified immediately. If the similarity is less than the reference value, a message for confirmation by the user (e.g., a message requesting a user confirmation) may be generated.

As an example, if a reference value for similarity is set to a threshold value (e.g., 0.9 in a range of 0 to 1, where 0 indicates that there is no similarity and 1 indicates that the compared objects are identical), and if a similarity between the stored image and the rear left seat is 0.9 or more, a rear left seat may be specified as the control target.

If there is no object with the similarity greater than or equal to the threshold (e.g., 0.9), and objects having the highest and the second highest similarity are the rear right seat and an armrest, respectively, a message for confirming whether the rear left seat or the armrest is to be controlled may be generated and may be output to the user. The generated message may be output visually and/or audibly.

The controller 250 and/or the result processing module 130 may generate a result processing signal for performing a control intended by the user for the recognized control target (1700).

As shown in FIG. 13, if the recognized control target corresponds to 'rear right heater', a control signal for turning on the rear right heater may be generated. The seat heating device 283 may be operated according to the generated control signal, and the rear right heater may be turned on.

The recognized control target or the recognized control target with the surroundings thereof may be enlarged and displayed. In this instance, by displaying a grid to correspond to the enlargement of the image and displaying indicators in the plurality of blocks divided by the grid, the components of the vehicle 1 may be distinguished from each other more precisely. A user may view the enlarged guide image and input a speech for further clarifying the previous control command and/or providing an additional control command.

For example, if an indicator '26' is selected, a block indicated by the indicator 26 and/or surroundings thereof may be enlarged and displayed as shown in FIG. 15, and a user may provide an additional speech for controlling a backrest angle, headrest angle, etc., of the rear right seat, while viewing the enlarged guide image.

If a guide image is enlarged and displayed, an object recognition may be performed with respect to the enlarged image. For example, if an area where many operating devices are disposed (e.g., a seat adjustment button on a door of each seat or a control panel on a center fascia) is enlarged, each of the operating devices may be recognized and displayed separately from each other, thereby allowing the user to easily distinguish the operating devices from each other.

The user's utterance or speech input in operation 1500 may include an enlargement command of a specific target or specific block, not a control command for a specific target. For example, a guide image may be enlarged and displayed according to the operations described above, and the user may view the enlarged image and provide a speech as an input for controlling the specific target.

If a control target specified by a user's utterance or speech does not match a command included in the user's utterance or speech (e.g., a command associated with the user's intent), a guide message may be generated to suggest a command matching the control target.

For example, if the guide image GI shown in FIG. 13 is displayed, and the user may utter "raise No. 29". But if a rear seat of the vehicle 1 may be configured to move forward or backward only, and not configured to move up and down, a guide message such as "the rear left seat may move forward or backward. What operation to perform?" may be generated.

Figure 16:
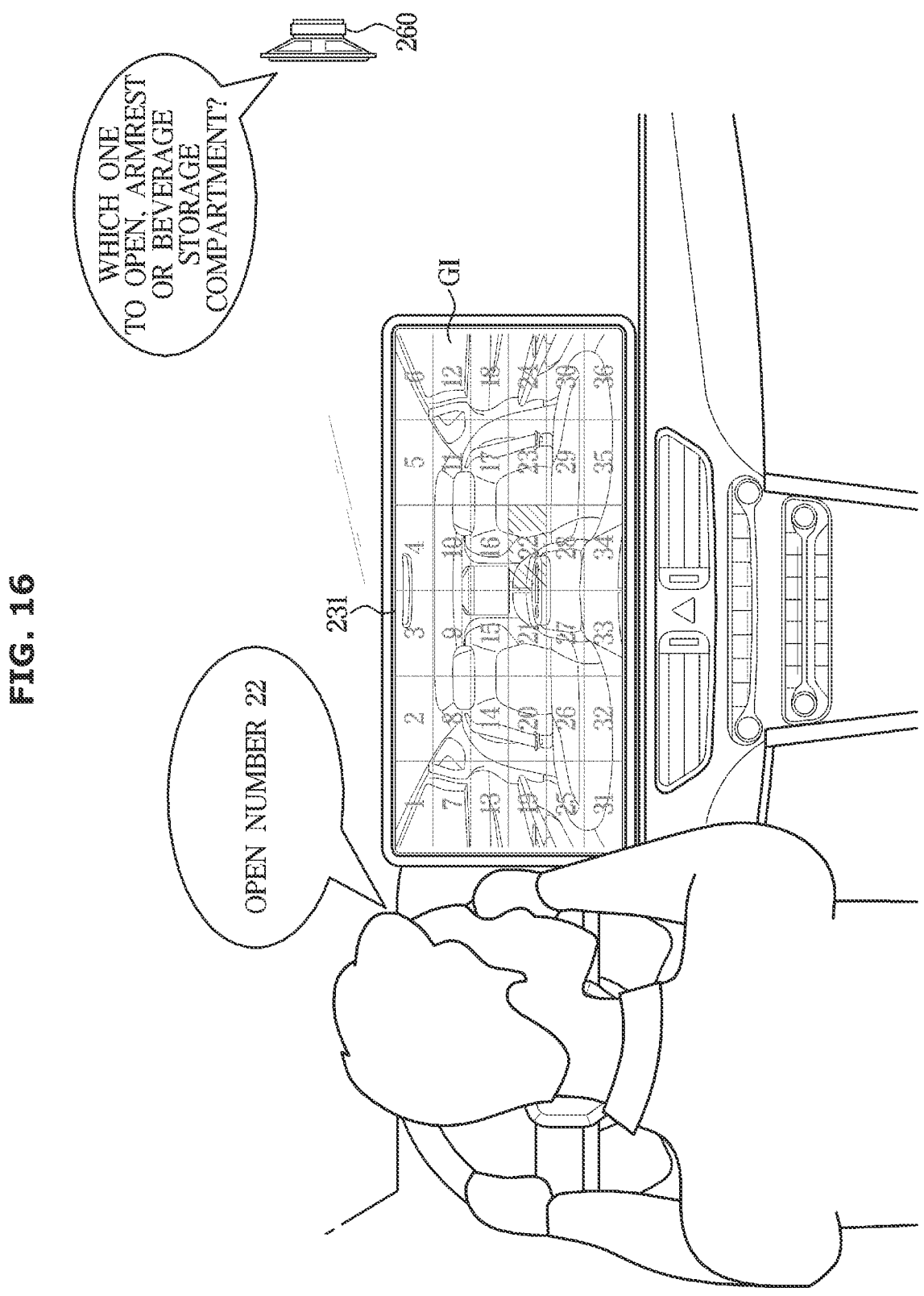
FIG. 16 is a diagram illustrating an example where two or more constituent components are included in a single block, in a method for providing a speech recognition service.
Figure 17:
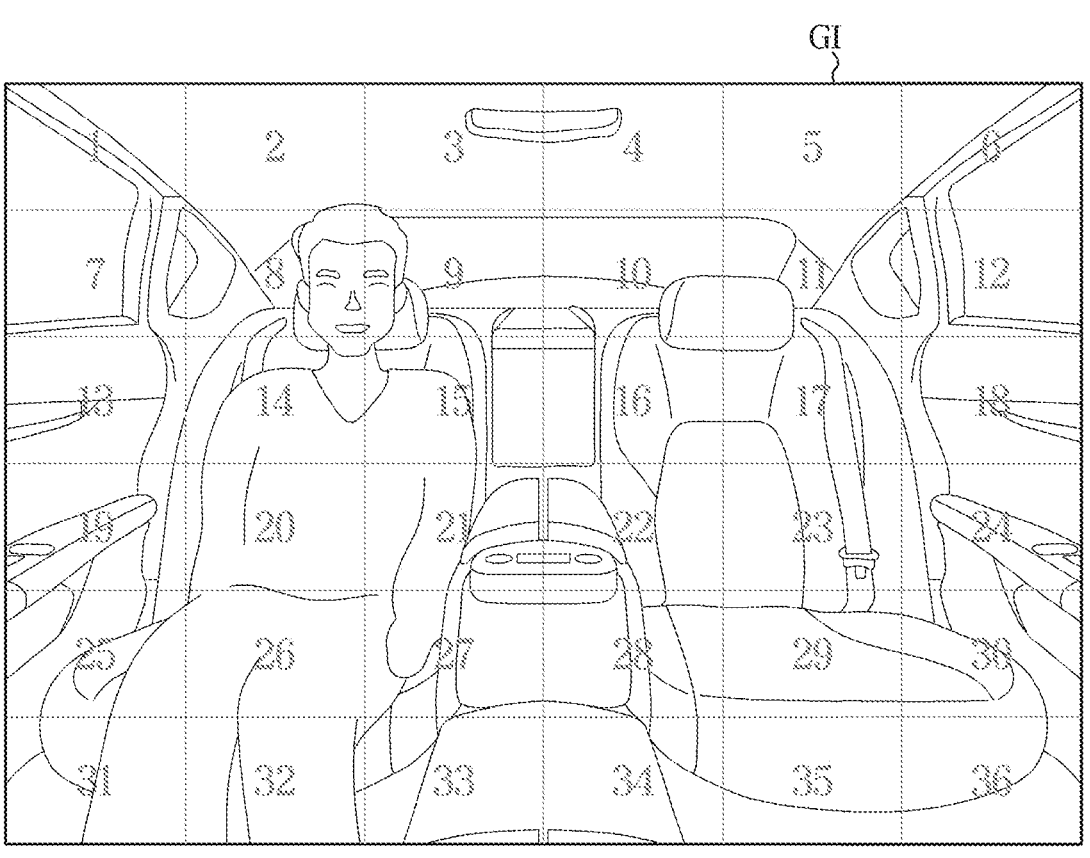
FIG. 17 is a diagram illustrating an example where a person or an object is located in a control target candidate, in a method for providing a speech recognition service.

FIG. 16 is a diagram illustrating an example where two or more components are included in a single block, in a method for providing a speech recognition service. FIG. 17 is a diagram illustrating an example where a person or an object is located in a control target candidate, in a method for providing a speech recognition service.

If a plurality of blocks are divided by a grid displayed on a vehicle image, two or more components may be included in a single block of the grid. Referring to the example of FIG. 16, a portion of the rear left seat 12L, a portion of a rear armrest 13, and a portion of a rear beverage storage compartment may be included in a block on which an indicator 22 is displayed. In this instance, a control target of which area included in a single block is less than or equal to a reference ratio may not be considered to be included in the corresponding block. For example, if only 10% (or less) of a total area of a control target is included in a single block, the control target may not be considered to be included in the corresponding block.

In this case, even if a user utters an indicator corresponding to an intended control target, the control target corresponding to the uttered indicator may not be accurately specified. Therefore, the speech recognition system 100 may perform an additional process for addressing the above problem.

As shown in FIG. 16, if a guide image GI is displayed on the AVN display 231 since a predetermined condition is satisfied and a user's speech, "open No. 22", is input, the result processing module 130 may determine that a plurality of control targets corresponding to the indicator 22 exist.

The result processing module 130 may attempt to recognize a control target based on an intent output from the natural language understanding module 120.

An intent corresponding to the user's utterance or speech may be [open, 22]. The result processing module 130 may select control targets which may be a target of an act of "open" from among control targets corresponding to the indicator 22.

Among the rear left seat 12L, the rear armrest 13, and the rear beverage storage compartment, the control targets which may be a target of an act of "open" correspond to the rear armrest 13 and the rear beverage storage compartment. The rear left seat 12L may not be a control target associated with the act "open", for example, if any part of the rear left seat 12L is not configured to be opened.

If a single control target corresponding to an intent exists, a control target intended by a user may be specified immediately (e.g., by eliminating other control target candidates that are not associated with the intent or the act). Like the example above, however, if a plurality of control targets corresponding to an intent exist, an additional process may be performed to specify the control target intended by the user among the plurality of control targets.

For example, the result processing module 130 may generate a system response for confirming whether the control target intended by the user is the rear armrest 13 or the rear beverage storage compartment, and the result processing module 130 may transmit the system response to the vehicle 1.

As shown in FIG. 16, the vehicle 1 may output a system response such as "which one to open, the armrest or the rear beverage storage compartment?" via the speaker 260 and/or any other output device, and specify the control target based on a user's additional speech input in response to the system response.

In addition to the driver, other passengers or cargo may be present in the vehicle 1. Other than components of the vehicle 1, other objects including a passenger (or an occupant) or cargo may be included in the vehicle image.

Referring to an example of FIG. 17, if a predetermined condition is satisfied ("turn on the rear seat heater" is uttered) in a state where a passenger is on the rear seat, a guide image GI may be displayed on the AVN display 231. The passenger sitting on the rear right seat 12R may be included in the guide image GI.

In this case, the user may select an indicator 26 (e.g., the user utters "26"). However, the exact position of indicator may not be identified due to the passenger in the rear right seat 12R, a user's speech including a term indicating the passenger may be input. For example, a user's speech, "turn on the seat heater where a person sits", may be input.

The result processing module 130 may determine the control target based on the term included in the received user's speech. For example, based on a result of image processing, the result processing module 130 may recognize that a seat on which the person sits is the rear right seat 12R, and generate a result processing signal for turning on a seat heater of the rear right seat 12R.

According to an embodiment of the disclosure, there is provided a vehicle, including: a camera configured to capture a vehicle image including an inside and an outside of the vehicle; a display provided inside the vehicle; and a controller configured to, when a predetermined condition is satisfied, control the camera to capture the vehicle image, and control the display to display the captured vehicle image by superimposing a graphic object and a plurality of indicators on the vehicle image, the graphic object dividing a plurality of blocks included in the vehicle image, the plurality of indicators respectively indicating the plurality of blocks, wherein, when a user's speech including at least one of the plurality of indicators is input, the controller is configured to control a control target corresponding to an indicator included in the user's speech.

In the above paragraphs, the graphic object may include a two-dimensional (2D) grid displayed by being superimposed on the vehicle image, and the plurality of indicators may be displayed by being superimposed on the plurality of blocks divided by the 2D grid, respectively.

In the above paragraphs, the graphic object may include a contour indicating a boundary of each of a plurality of objects included in the vehicle image, and the plurality of indicators may be displayed by being superimposed on the plurality of blocks divided by the contour.

In the above paragraphs, the indicator may include at least one of a number, a character, or a figure.

In the above paragraphs, the predetermined condition may include at least one of an instance when a user's subsequent speech is required to specify the control target, or an instance when a context that requires a control for a specific control target occurs.

In the above paragraphs, the camera may include a first camera configured to capture a rear interior of the vehicle and a second camera configured to capture a front interior of the vehicle.

In the above paragraphs, the controller may be configured to: when a control target candidate is located in the rear interior of the vehicle, control the first camera to capture the vehicle image, and when the control target candidate is located in the front interior of the vehicle, control the second camera to capture the vehicle image.

In the above paragraphs, the camera may be rotatably provided and configured to capture a rear interior of the vehicle at a first rotation angle and capture a front interior of the vehicle at a second rotation angle.

In the above paragraphs, the controller may be configured to: when a control target candidate is located in the rear interior of the vehicle, rotate the camera at the first rotation angle to capture the vehicle image, and when the control target candidate is located in the front interior of the vehicle, rotate the camera at the second rotation angle to capture the vehicle image.

In the above paragraphs, the vehicle may further include a communication module configured to communicate with a server determining a user intention based on the user's speech and generating a result processing signal for controlling the vehicle according to the user intention.

In the above paragraphs, the communication module may be configured to receive the result processing signal from the server, and the controller may be configured to control the control target based on the received result processing signal.

In the above paragraphs, the vehicle may further include a speaker, wherein, when a plurality of control targets corresponding to the indicator included in the user's speech exist, the controller may be configured to control the speaker to output a guide signal for specifying a control target intended by the user among the plurality of control targets.

According to an embodiment of the disclosure, there is provided a method for providing a speech recognition service, the method including: receiving a speech from a user located in a vehicle; specifying an action and a control target intended by the user based on the user's speech; when the control target is not specified, transmitting a result processing signal for displaying a guide image in the vehicle, wherein the guide image is displayed by superimposing a vehicle image including an inside and an outside of the vehicle, a graphic object dividing a plurality of blocks included in the vehicle image, and a plurality of indicators respectively indicating the plurality of blocks.

In the above paragraphs, the method may further include: receiving a user's speech including at least one of the plurality of indicators; and determining a control target corresponding to an indicator included in the received user's speech.

In the above paragraphs, the graphic object may include a 2D grid displayed by being superimposed on the vehicle image, and the plurality of indicators may be displayed by being superimposed on the plurality of blocks divided by the 2D grid, respectively.

In the above paragraphs, the method may further include: mapping and storing a constituent component of the vehicle corresponding to each of the plurality of blocks to an indicator displayed by being superimposed on each of the plurality of blocks or to each of the plurality of blocks.

In the above paragraphs, the determining of the control target corresponding to the indicator included in the received user's speech includes determining, as the control target, a constituent component of the vehicle mapped and stored to the indicator included in the received user's speech or to a block on which the indicator is displayed among the plurality of blocks.

In the above paragraphs, the graphic object may include a contour indicating a boundary of each of a plurality of objects included in the vehicle image, and the plurality of indicators may be displayed by being superimposed on the plurality of blocks divided by the contour.

In the above paragraphs, the determining of the control target corresponding to the indicator included in the received user's speech may include determining, as the control target, an object corresponding to the indicator included in the received user's speech among a plurality of objects included in the vehicle image.

In the above paragraphs, the method may further include: when another object including an occupant or cargo other than the constituent component of the vehicle is included in the vehicle image, receiving a user's speech including a term indicating the other object; and determining a control target based on the term included in the received user's speech.

According to an embodiment of the disclosure, there is provided a speech recognition system, including: a communication module configured to receive a speech of a user located in a vehicle; a natural language understanding module configured to specify an action and a control target intended by the user based on the user's speech; and a result processing module configured to generate a result processing signal for displaying a guide image in the vehicle, when the control target is not specified, wherein the guide image is displayed by superimposing a vehicle image including an inside and an outside of the vehicle, a graphic object dividing a plurality of blocks included in the vehicle image, and a plurality of indicators respectively indicating the plurality of blocks.

The communication module may be configured to receive the user's speech including at least one of the plurality of indicators, and the result processing module may be configured to determine a control target corresponding to an indicator included in the received user's speech.

The graphic object may include a 2D grid displayed by being superimposed on the vehicle image, and the plurality of indicators may be displayed by being superimposed on the plurality of blocks divided by the 2D grid, respectively.

The result processing module may be configured to map and store a constituent component of the vehicle corresponding to each of the plurality of blocks to an indicator displayed by being superimposed on each of the plurality of blocks or to each of the plurality of blocks.

The result processing module may be configured to determine, as the control target, a constituent component of the vehicle mapped and stored to the indicator included in the received user's speech or to a block on which the indicator is displayed among the plurality of blocks.

The graphic object may include a contour indicating a boundary of each of a plurality of objects included in the vehicle image, and the plurality of indicators may be displayed by being superimposed on the plurality of blocks divided by the contour.

The result processing module may be configured to determine, as the control target, an object corresponding to the indicator included in the received user's speech among a plurality of objects included in the vehicle image.

As is apparent from the above, according to various examples of the disclosure, the vehicle, the speech recognition system, and the method for providing a speech recognition service can use a user's speech to specify a control target by displaying a vehicle image displaying vehicle components corresponding to control targets.

Although various examples have been described for illustrative purposes, those skilled in the art will appreciate that various modifications, additions and substitutions are possible, without departing from the scope and spirit of the disclosure.

What is claimed is:

1. A vehicle comprising:
a camera configured to capture a vehicle image of the vehicle, wherein the vehicle image includes an image of a plurality of vehicle components of the vehicle, wherein the vehicle image comprises an image corresponding to a portion of a vehicle interior of the vehicle, and wherein the plurality of vehicle components of the vehicle comprise a plurality of vehicle components equipped in the vehicle interior of the vehicle;
a display provided inside the vehicle; and
a controller configured, based on a condition being satisfied, to control the camera to capture the vehicle image, and to control the display to display a guide image, wherein the guide image comprises the vehicle image, a graphic object, and a plurality of indicators, wherein the graphic object comprises a two-dimensional (2D) grid superimposed on the vehicle image, wherein the graphic object indicates a plurality of portions, of the vehicle image, defined by the 2D grid, wherein each of the plurality of indicators is respectively superimposed on one of the plurality of portions, wherein the plurality of vehicle components of the vehicle correspond to different indicators of the plurality of indicators, wherein the controller is configured to control, based on a user utterance associated with at least one indicator of the plurality of indicators, a control target corresponding to the at least one indicator, and wherein the control target is a controllable vehicle component of the vehicle.

2. The vehicle of claim 1, wherein the camera is configured to capture a second vehicle image comprising an image corresponding to a plurality of portions of a single vehicle, wherein the second vehicle image includes an image of a plurality of second vehicle components of the single vehicle, wherein the plurality of second vehicle components of the single vehicle comprise at least one of:
a plurality of vehicle components equipped in a vehicle interior of the single vehicle, or a plurality of exterior vehicle components corresponding to a plurality of exterior components of the single vehicle, wherein the controller is configured, based on a condition being satisfied, to control the camera to capture the second vehicle image, and to control the display to display a second guide image, wherein the second guide image comprises the second vehicle image, a second graphic object, and a plurality of second indicators, wherein the second graphic object comprises a contour indicating a boundary of each of a plurality of objects comprised in the second vehicle image, wherein each of the plurality of second indicators is respectively superimposed on one of the plurality of portions of the single vehicle, and wherein the plurality of portions of the single vehicle are defined by the contour.

3. The vehicle of claim 1, wherein the condition comprises at least one of:

a first condition that requires a subsequent user utterance to specify the control target; or a second condition in which a context that requires a control for a specific control target occurs.

4. The vehicle of claim 1, further comprising a first camera configured to capture a rear interior of the vehicle and a second camera configured to capture a front interior of the vehicle, wherein the vehicle image is an image corresponding to a portion of the captured rear interior or a portion of the captured front interior, wherein the controller is further configured to:

based on a user utterance associated with a controllable object in the vehicle, identify the controllable object, wherein the controllable object is a single object having a plurality of controllable portions, and wherein the control target is associated with a controllable portion of the plurality of controllable portions.

5. The vehicle of claim 4, wherein the controller is configured to control at least one of:

based on a control target candidate being located in the rear interior of the vehicle, the first camera to capture the vehicle image, or based on a control target candidate being located in the front interior of the vehicle, the second camera to capture the vehicle image.

6. The vehicle of claim 1, further comprising a rotatable camera configured to capture a rear interior of the vehicle at a first rotation angle and capture a front interior of the vehicle at a second rotation angle, wherein the vehicle image is an image corresponding to a portion of the captured rear interior or a portion of the captured front interior.

7. The vehicle of claim 6, wherein the controller is configured to control at least one of:

based on a control target candidate being located in the rear interior of the vehicle, a rotation of the rotatable camera at the first rotation angle to capture the vehicle image, or based on a control target candidate being located in the front interior of the vehicle, a rotation of the rotatable camera at the second rotation angle to capture the vehicle image.

8. The vehicle of claim 1, further comprising:

a communication device configured to receive a result processing signal for controlling the vehicle, wherein the result processing signal indicates a user intention associated with the user utterance, wherein the controller is configured to control the control target based on the result processing signal.

9. The vehicle of claim 1, further comprising:

a speaker, wherein the controller is configured to:

determine, based on a plurality of control targets corresponding to the at least one indicator being identified, that the condition is satisfied; and control the speaker to output a guide signal for specifying the control target as a control target intended by a user among the plurality of control targets.

10. The vehicle of claim 1, wherein the controller is configured to control the display to display an enlarged portion, of the plurality of portions, on which the at least one indicator is displayed, and adjust the 2D grid and the plurality of indicators to correspond to the enlarged portion on which the at least one indicator is displayed.

11. A vehicle system comprising:

a communication device configured to receive data indicating an utterance of a user in a vehicle;

a camera configured to capture a vehicle image of the vehicle, wherein the vehicle image includes an image of a plurality of vehicle components of the vehicle, wherein the vehicle image comprises an image corresponding to a portion of a vehicle interior of the vehicle, and wherein the plurality of vehicle components of the vehicle comprise a plurality of vehicle components equipped in the vehicle interior of the vehicle;

at least one processor; and memory storing instructions that, when executed by the at least one processor, cause the vehicle system to:

control, based on a condition being satisfied, the camera to capture the vehicle image;

determine, based on the data indicating the utterance of the user, an action and a control target intended by the user, wherein the control target is a controllable vehicle component of the plurality of vehicle components; and generate, based on a determination of the action and the control target, a result processing signal for displaying a guide image on a display provided inside the vehicle, wherein the guide image comprises the vehicle image, a graphic object, and a plurality of indicators, wherein the graphic object comprises a contour indicating a boundary of each of a plurality of objects comprised in the vehicle image, wherein the graphic object and the plurality of indicators are superimposed on the vehicle image, wherein the graphic object indicates a plurality of portions, of the vehicle image defined by the contour, wherein the plurality of vehicle components of the vehicle correspond to different indicators of the plurality of indicators, wherein each of the plurality of indicators is respectively superimposed on one of the plurality of portions, and wherein the instructions, when executed by the at least one processor, cause the vehicle system to: control, based on a user utterance associated with at least one indicator of the plurality of indicators, a control target that corresponds to the at least one indicator and is a controllable vehicle component of the plurality of vehicle components.

12. The vehicle system of claim 11, wherein the communication device is configured to receive data comprising at least one indicator of the plurality of indicators, and wherein the instructions, when executed by the at least one processor, cause the vehicle system to determine the control target, wherein the control target corresponds to the at least one indicator.

13. The vehicle system of claim 11, wherein the instructions, when executed by the at least one processor, cause the vehicle system to map a component of the vehicle to:

at least one indicator superimposed on at least one portion of the plurality of portions; or the at least one portion of the plurality of portions.

14. The vehicle system of claim 12, wherein the instructions, when executed by the at least one processor, cause the vehicle system to determine, as the control target, a component of the vehicle mapped to:

the at least one indicator; or a portion, of the plurality of portions, on which the at least one indicator is displayed.

15. The vehicle system of claim 12, wherein the instructions, when executed by the at least one processor, cause the vehicle system to determine, as the control target, an object corresponding to the at least one indicator among a plurality of objects comprised in the vehicle image.

16. An apparatus comprising:

a camera configured to capture an object image, wherein the object image includes an image of a plurality of vehicle components of a vehicle, wherein the object image comprises an image corresponding to a portion of a vehicle interior of the vehicle, and wherein the plurality of vehicle components of the vehicle comprise a plurality of vehicle components equipped in the vehicle interior of the vehicle;

a communication device configured to receive data indicating an utterance of a user of the vehicle; and a controller configured to:

determine, based on the data indicating the utterance of the user, a plurality of indicators;

based on a condition being satisfied, control the camera to capture the object image, and control a display of the vehicle to display a guide image, wherein the guide image comprises the object image, a graphic object, and the plurality of indicators, wherein the graphic object comprises a two-dimensional (2D) grid superimposed on the object image, wherein the graphic object indicates a plurality of portions, of the object image, defined by the 2D grid, wherein each of the plurality of indicators is respectively superimposed on one of the plurality of portions, wherein the plurality of vehicle components of the vehicle correspond to different indicators of the plurality of indicators; and generate, based on a subsequent user utterance input associated with at least one indicator of the plurality of indicators, a control signal to control a control target corresponding to the at least one indicator, wherein the control target is a controllable vehicle component of the plurality of vehicle components, and wherein the control target is associated with a controllable portion of a single object controllable by the user.

17. The apparatus of claim 16, wherein the single object is a single object, of a vehicle, having a plurality of controllable portions, wherein the controller is further configured to identify, based on the utterance of the user, the single object, and wherein the subsequent user utterance input comprises at least one of:

a further utterance of the user; or an utterance of a second user.

*   *   *   *   *